(12) United States Patent
Kawai et al.

(10) Patent No.: US 7,155,986 B2
(45) Date of Patent: Jan. 2, 2007

(54) POWER FASTENING TOOL

(75) Inventors: Kozo Kawai, Neyagawa (JP);
Yoshinori Sainomoto, Sanda (JP);
Tatsuhiko Matsumoto, Habikino (JP);
Tadashi Arimura, Kyoto (JP);
Toshiharu Ohashi, Sakata-gun (JP);
Hiroshi Miyazaki, Hikone (JP);
Hidenori Shimizu, Hikone (JP);
Fumiaki Sawano, Hikone (JP)

(73) Assignee: Matsushita Electric Works, Ltd., Osaka (JP)

( * ) Notice: Subject to any disclaimer, the term of this patent is extended or adjusted under 35 U.S.C. 154(b) by 111 days.

(21) Appl. No.: 10/962,621

(22) Filed: Oct. 13, 2004

(65) Prior Publication Data

US 2005/0109520 A1    May 26, 2005

(30) Foreign Application Priority Data

Oct. 14, 2003   (JP)   ............................. 2003-354198

(51) Int. Cl.
  *B25B 23/14*   (2006.01)
(52) U.S. Cl. .................................................. 73/862.21
(58) Field of Classification Search ............. 73/862.23, 73/862.21; 173/2, 4, 176
See application file for complete search history.

(56) References Cited

U.S. PATENT DOCUMENTS 6,978,846 B1 * 12/2005 Kawai et al. .................. 173/2

FOREIGN PATENT DOCUMENTS

| JP | 4-322974 | 11/1992 |
|---|---|---|
| JP | 6-91551 | 4/1994 |
| JP | 9-285974 | 11/1997 |
| JP | 2000-354976 | 12/2000 |
| JP | 2001-277146 | 10/2001 |

OTHER PUBLICATIONS

English Language Abstract of JP 4-322974.
English Language Abstract of JP 9-285974.
English Language Abstract of JP 6-91551.
English Language Abstract of JP2001-277146.
English Language Abstract of JP2000-354976.
U.S. Appl. No. 10/962,565.
U.S. Appl. No. 10/924,979.

* cited by examiner

*Primary Examiner*—Jewel Thompson
(74) *Attorney, Agent, or Firm*—Greenblum & Bernstein, P.L.C.

(57) ABSTRACT

In a power fastening tool for fastening a fastening member such as a screw or a fastening member, malfunction that driving of a motor is stopped before the fastening member is fastened completely can be prevented. A fastening judger judges that the fastening operation is completed when a value of an estimated torque T for fastening the fastening member becomes larger than a predetermined lower limit value T1 previously set by a user and a value of a torque variation ratio $\Delta\Delta T$ varies from positive to negative. Thus, it is possible to prevent malfunction for stopping driving of a motor even when the value of the torque variation ratio $\Delta\Delta T$ varies from positive to negative due to trouble before the vale of the estimated torque T becomes larger than the lower limit value T1.

17 Claims, 21 Drawing Sheets

FIG. 19

| LEVEL | T1/T2 |
|---|---|
| 9 | 40% |
| 8 | 45% |
| 7 | 50% |
| 6 | 55% |
| 5 | 60% |
| 4 | 65% |
| 3 | 70% |
| 2 | 75% |
| 1 | 80% |

FIG. 24

|  | 15mm | 25mm | 50mm | 75mm |
|---|---|---|---|---|
| PLASTER BOARD | 1 | 1 | 2 | 2 |
| ALMINUM | 1 | 2 | 3 | 4 |
| WOODWORK | 2 | 4 | 6 | 8 |
| METALWORK | 3 | 5 | 7 | 9 |

…

POWER FASTENING TOOL

BACKGROUND OF THE INVENTION

1. Field of the Invention

The present invention relates to a power fastening tool such as an impact driver or an impact wrench used for fastening a fastening member such as a screw or a bolt.

2. Description of the Related Art

Conventionally, a power fastening tool used for fastening a fastening member such as a screw or a bolt utilizing driving force of a motor has a function automatically stopping driving of the motor when a torque necessary for fastening the fastening member reaches to a predetermined value due to the fastening member is fastened completely.

In a first conventional power fastening tool such as an impact wrench used for fastening a fastening member, for example, shown in publication gazette of Japanese Patent Application 4-322974, a number of impact of a hammer is sensed and driving of a motor is automatically stopped when the number of impact reaches to a predetermined reference number.

In a second conventional power fastening tool shown in publication gazette of Japanese Patent Application 9-285974, a rotation angle of a fastening member is sensed, and driving of a motor is stopped, when the rotation angle reaches to a predetermined reference angle.

In a third conventional power fastening tool shown in publication gazette of Japanese Patent Application 6-91551, an actual torque, which is necessary for fastening a fastening member, is sensed and driving of a motor is stopped when the actual torque reaches to a predetermined reference value.

The first conventional power fastening tool which stops the driving of the motor corresponding to the impact number and the second conventional power fastening tool which stops the driving of the motor corresponding to the rotation angle respectively have a disadvantage that a large difference may occur between a desired torque and the actual torque for fastening the fastening member. The difference causes loosening of the fastening member due to insufficient torque when the actual torque is much smaller than the desired torque. Alternatively, the difference causes to damage the elements to be fastened by the screw or the bolt or to damage a head of the fastening member due to superfluous torque when the actual torque is much larger than the desired torque.

On the other hand, the third conventional power fastening tool which stops the driving of the motor corresponding to the actual torque for fastening the fastening member needs a sensor provided on an output shaft for sensing the actual torque, so that it causes the cost increase and the upsizing of the power impact tool, even though the automatic stopping of the driving of the motor can be controlled precisely corresponding to the actual torque.

For solving the above-mentioned problems, in a fourth conventional power fastening tool shown in publication gazette of Japanese Patent Application 2001-277146, a torque for fastening the fastening member is estimated according to rotation speed of a shaft of a motor or impact energy of a hammer. It is judged that the fastening member is fastened completely when the estimated torque is suddenly increased. The driving of the motor is stopped when the estimated torque is suddenly increased.

In the fourth conventional power fastening tool, there is a possibility that the driving of the motor is stopped before the fastening member is fastened completely, when the torque is temporarily increased due to trouble in fastening operation. In order to prevent the stop of the driving of the motor before the fastening member is fastened completely, it is considered that the motor is stopped only when the value of the torque becomes larger than a predetermined threshold value. In the actual fastening operation, since the bolts, the nuts, and so on having various diversiform or made of various materials can be used as the fastening member, it is difficult to stop the rotation of the motor surely at the moment when the fastening member is fastened completely by setting one threshold value with respect to the torque for fastening the fastening member.

As examples of cause of the trouble in the fastening operation, an irregularity of thread grooves of the bolt, a slight warp of a member interleaved between the bolt and the nut, decentering of the bolt or the nut, clipping of dust between the bolt and the nut, picking off of a surface coating of baking finish on the bolt, lifting of a member inter leaved between the bolt and the nut, are recited.

SUMMARY OF THE INVENTION

A purpose of the present invention is to provide a power fastening tool used for fastening a fastening member such as a screw or a bolt, by which driving of a motor can surely be stopped just when the fastening member is fastened completely without reacting the temporary torque increase, even though various kinds of fastening member and component to be fastened are used.

A power fastening tool in accordance with an aspect of the present invention comprises: a motor; a motor controller for controlling start and stop of driving of the motor; a power transmitter for transmitting driving force of the motor to an output shaft for fastening or loosening the fastening member; a torque estimator for estimating a value of a torque for fastening the fastening member; and a fastening judger for judging whether the fastening member is fastened completely, or not.

The fastening judger calculates a torque variation quantity $\Delta T$ which is a ratio of variation of the estimated torque T with respect to a rotation angle of a shaft of the motor or elapsed time, and a torque variation ratio $\Delta\Delta T$ which is a ratio of the torque variation quantity $\Delta T$ with respect to the rotation angle of the shaft of the motor or elapsed time.

Subsequently, the fastening judger judges that the fastening operation is completed when a value of the estimated torque T becomes larger than a predetermined lower limit value T1 of the torque and a value of the torque variation ratio $\Delta\Delta T$ varies from positive to negative.

In a fastening operation of a fastening member such as a screw or a bolt, the peak value of the torque variation ratio $\Delta\Delta T$ due to trouble is generally smaller than that due to the complete fastening of the fastening member and the value of the estimated torque T at a time when the trouble occurs is also smaller than that when the fastening member is fastened completely. When the lower limit value T1 is properly set between the peak value of the torque variation ratio $\Delta\Delta T$ due to the complete fastening of the fastening member and the peak value due to the trouble, it is possible to distinguish the torque increase due to the complete fastening of the fastening member from the torque increase due to the trouble. Thus, the power fastening tool configured above can automatically stop the driving of the motor just after the fastening member is fastened completely.

It is possible that the power fastening tool further comprises a torque setter by which a user can optionally set the predetermined lower limit value T1.

Since the lower limit value T1 of the torque can optionally be set by the user, it is possible to stop the driving of the motor just when the fastening member is fastened completely by setting the lower limit value T1 to a proper value corresponding to a kind of the fastening member or a kind of material of a component to be fastened by the fastening member.

It is further possible that the fastening judger calculates a torque variation quantity ΔT which is a ratio of variation of the estimated torque T with respect to a rotation angle of a shaft of the motor or elapsed time, a torque variation ratio ΔΔT which is a ratio of the torque variation quantity ΔT with respect to the rotation angle of the shaft of the motor or elapsed time, and a sum or an integration value of the torque variation ratio ΔΔT in a term where the torque variation ratio ΔΔT continuously takes positive values.

Subsequently the fastening judger judges that the fastening member has been fastened completely when the sum or the integration value of the torque variation ratio ΔΔT becomes larger than a predetermined threshold value C, further to the condition that the value of the estimated torque T for fastening the fastening member becomes larger than the lower limit value T1 and a value of the torque variation ratio ΔΔT varies from positive to negative.

As mentioned above, the peak value of the torque variation ratio ΔΔT due to trouble is generally smaller than that due to the complete fastening of the fastening member, and the term where the torque variation ratio ΔΔT continuously takes positive values due to the trouble occurs is also shorter than that due to the complete fastening of the fastening member. The sum or the integration value of the torque variation ratio ΔΔT in the section where the torque variation ratio ΔΔT continuously takes positive values due to the trouble is much smaller than that due to the complete fastening of the fastening member. Thus, it is possible to distinguish the torque increase due to the complete fastening of the fastening member from the torque increase due to the trouble, surely, even if the torque increase due to the trouble larger than the lower limit value occurs. It is possible to prevent the stopping of the driving of the motor, even when a peak value of the torque variation ratio ΔΔT appears due to trouble before the fastening member has been fastened completely.

Alternatively, the fastening judger can judge that the fastening operation is completed when a value of the estimated torque T becomes larger than a predetermined lower limit value T1 of the torque and a value of the torque variation ratio ΔΔT varies from positive to negative, or when a sum or an integration value of the torque variation ratio ΔΔT in a term where the torque variation ratio ΔΔT continuously takes positive values becomes larger than the predetermined threshold value C, further to the condition that the value of the estimated torque T for fastening the fastening member becomes larger than the lower limit value T1 and a value of the torque variation ratio ΔΔT varies from positive to negative.

In the former case, it is possible to stop the driving of the motor before the estimated torque T for fastening the fastening member takes the peak value after the fastening member has been fastened completely, so that it is suitable for a low torque fastening operation such as woodwork. In the latter case, it is possible to stop the driving of the motor when the estimated torque T for fastening the fastening member takes substantially the peak value so that it is suitable for a high torque fastening operation such as metalwork.

It is possible that the power fastening tool further comprises a judging condition selector by which the user can optionally select alternative of the above-mentioned two conditions for judging that the fastening operation is completed. The user can easily select the condition for the judgment suitable for the work operation by using the judging condition selector.

BRIEF DESCRIPTION OF THE DRAWINGS

FIG. 19 is a table showing a relation of a lower limit value T1 against an n upper limit value T2 (T1/T2) with respect to level of the upper limit value T2 in the fourth embodiment;

FIG. 24 is a table showing an example of levels of the lower limit value T1 and/or the upper limit value T2 corresponding combination of to the materials of the component to be fastened and the size of the fastening member in the sixth embodiment.

DETAILED DESCRIPTION OF THE EMBODIMENT

First Embodiment

Figure 1:
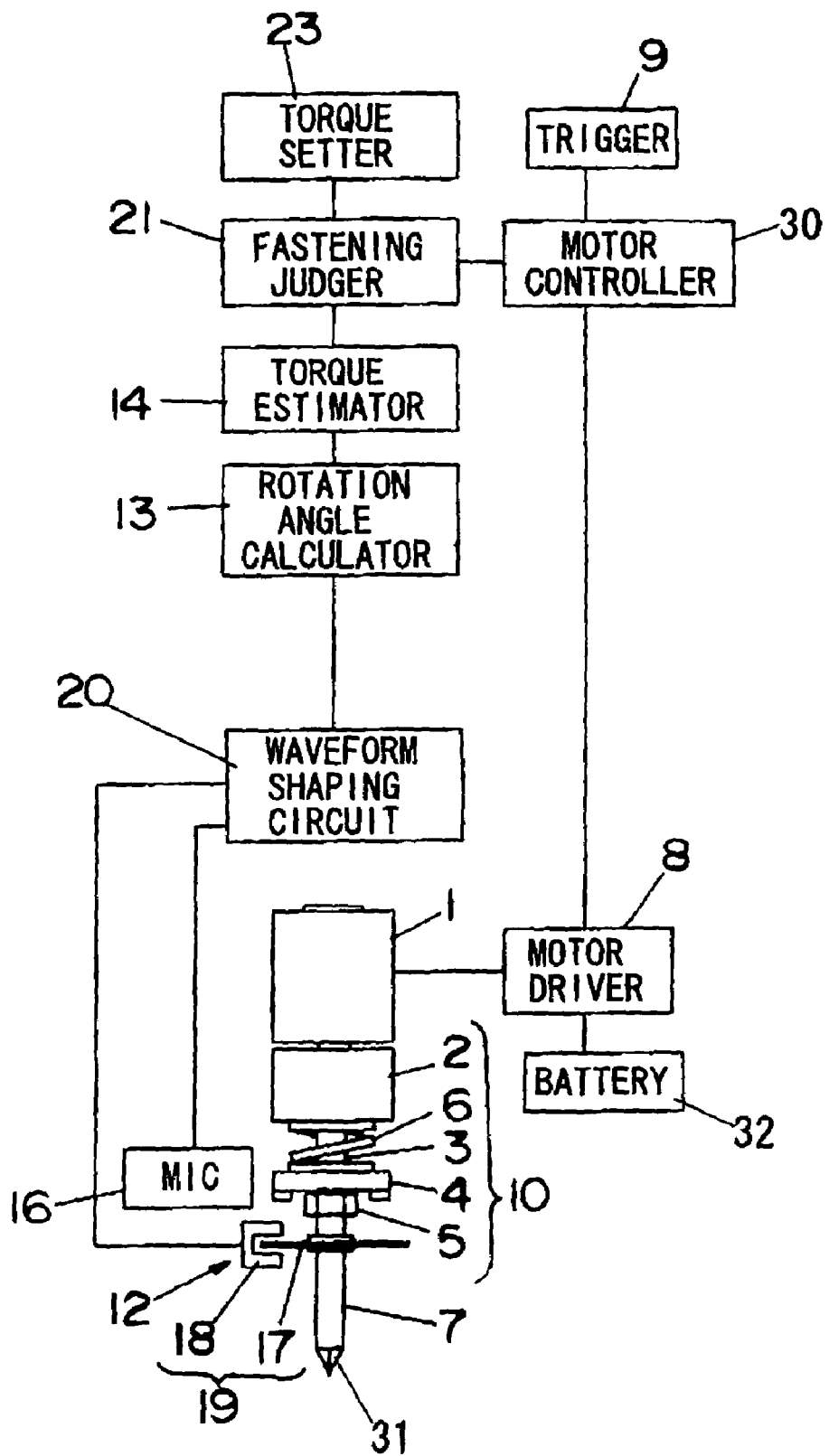
FIG. 1 is a block diagram showing a configuration of a power impact tool, which is an example of a power fastening tool in accordance with a first embodiment of the present invention.

A power fastening tool in accordance with a first embodiment of the present invention is described. FIG. 1 shows a configuration of a power impact tool used for fastening a fastening member such as a screw or a bolt as an example of the power fastening tool in the first embodiment.

The power impact tool comprises a motor 1 for generating a driving force, and a power transmitter 10 for transmitting the driving force of the motor 1 to an output shaft 7. A bit 31 for fastening or loosening a fastening member such as a screw or a bolt is detachable fitted to a top end of the output shaft 7. The power transmitter 10 further comprises a reducer 2 for reducing rotation speed of a shaft of the motor 1 (hereinafter abbreviated as rotation speed of the motor 1), a driving shaft 3 connected to the reducer 2 and rotated by the driving force of the motor 1, a hammer 4 engaged with the driving shaft 3 via a spline bearing, an anvil 5 engaged with the driving shaft 3 with a clutch mechanism, and a spring 6 for applying pressing force to the hammer 4 toward the anvil 5.

The hammer 4 can be moved in an axial direction of the driving shaft 3 via the spline bearing, and rotated with the driving shaft 3. The clutch mechanism is provided between the hammer 4 and the anvil 5. The hammer 4 is pressed to the anvil 5 by the pressing force of the spring 6 in an initial state. The output shaft 7 is detachable fitted to the anvil 5. Thus, the output shaft 7 can be rotated with the driving shaft 3, the hammer 4 and the anvil 5 by the driving force of the motor 1.

A pair of cam faces is formed on, for example, an upper face of the anvil 5 and a lower face of the hammer 4, which serve as the cam mechanism. For example, when the fastening member has been fastened and the rotation of the output shaft 7 is stopped, the cam face on the hammer 4 slips on the cam face on the anvil 5 owing to the rotation with the driving shaft 3 and the hammer 4 moves in a direction depart from the anvil 5 along the driving shaft 3 following to the elevation of the cam faces against the pressing force of the spring 6. When the hammer 4 goes around, for example, substantially one revolution, the restriction due to the cam faces is suddenly released, so that the hammer 4 impacts the anvil 5 owing to charged pressing force of the spring 6 while it is rotated with the driving shaft 3. Thus, a powerful fastening force can be applied to the output shaft 7 via the anvil 5, since the mass of the hammer 4 is much larger than that of the anvil 5. By repeating the impact of the hammer 4 against the anvil 5 in the rotation direction, the fastening member can be fastened completely with a necessary fastening torque.

The motor 1 is driven by a motor driver 8 so as to start and stop the rotation of the shaft. The motor driver 8 is further connected to a motor controller 30, to which a signal corresponding to a displacement (stroke or pressing depth) of a trigger switch 9 is inputted. The motor controller 30 judges user's intention to start or to stop the driving of the motor 1 corresponding to the signal outputted from the trigger switch 9, and outputs a control signal for starting or stopping the driving of the motor 1 to the motor driver 8.

The motor driver 8 is constituted as an analogous power circuit using a power transistor, and so on for supplying large electric current to the motor 1 stably. A rechargeable battery 32 is connected to the motor driver 8 for supplying electric power to the motor 1. On the other hand, the motor controller 30 is constituted by, for example, a CPU (Central Processing Unit), a ROM (Read Only Memory) and a RAM (Random Access Memory) for generating the control signals corresponding to a control program.

The power impact tool further comprises an impact sensor 11 for sensing that the impact of the hammer 4 against the anvil 5 is carried out, a rotation angle sensor 12 for sensing the rotation angle of the output shaft 7, a rotation angle calculator 13 for calculating a rotation angle Δr of the anvil 5 or the output shaft 7 per one impact of the hammer 4 with using outputs of the impact sensor 11 and the rotation angle sensor 12, and a torque estimator 14 for estimating a torque for fastening the fastening member with using the rotation angle Δr. These elements constitute a means for estimating the torque for fastening the fastening member.

Specifically, the impact sensor 11 is a microphone 16 for sensing impact boom generated when the hammer 4 impacts the anvil 5 as a variation of voltage. The rotation angle sensor 12 is a rotary encoder 19 constituted by a disc 17 rotated with the output shaft 7 and having slits and a transmission photo-interrupter 18 for sensing the rotation angle of the disc 17. Thus, the rotation angle of the anvil 5 or the output shaft 7 is sensed as pulse signals. The microphone 16 and the rotary encoder 19 are respectively connected to a waveform shaping circuit 20 so as to be executed the filtering process, and the processed signals by the waveform shaping circuit 20 are inputted to the rotation angle calculator 13.

The rotation angle calculator 13 serially calculates the rotation angles Δr of the anvil 5 or the output shaft 7 per one impact of the hammer 4, and the torque estimator 14 serially estimates the estimated torque T for fastening the fastening member. The estimated torque T is calculated by the following equation showing the relation that the energy applied by the impact is substantially equal to the energy exhausted in the fastening of the fastening member.

$$T = (J \times \omega^2)/(2 \times \Delta r)$$

Hereupon, the symbol T designates the estimated torque for fastening the fastening member, the symbol J designates the moment of inertia of the anvil 5, and the symbol ω designates the rotation speed of the anvil 5 when the impact of the hammer 4 is carried out.

The power impact tool further comprises a fastening judger 21 and a torque setter 23 connected to the fastening judger 21. The fastening judger 21 calculates a torque variation quantity ΔT and a torque variation ratio ΔΔT from the estimated torque T calculated by the torque estimator 14 and judges whether the fastening operation of the fastening member is completed, or not. The torque variation quantity ΔT corresponds to a ratio of the variation of the estimated torque T for fastening the fastening member with respect to the rotation angle of the shaft of the motor 1 or elapsed time. The torque variation ratio ΔΔT corresponds to a ratio of the variation of the torque variation quantity ΔT with respect to the rotation angle of the motor 1 or elapsed time.

For obtaining the torque variation quantity ΔT and the torque variation ratio ΔΔT, it is possible to calculate a difference between a value calculated in this time and a value previously calculated, simply. It, however, is preferable to calculate a difference between a mean value among a first predetermined number of values of the estimated torque T and the torque variation quantity ΔT and another mean value among a second predetermined number of the values of them, in order to comprehend the variations of the estimated torque T or the torque variation quantity ΔT in their entirety. Specifically, the torque variation quantity ΔT is a difference between a mean value among four values of the estimated torque T and another mean value among sixteen values of the estimated torque T. Similarly, the torque variation ratio ΔΔT is a difference between a mean value among two values of the torque variation quantity ΔT and another mean value among eight values of the torque variation quantity ΔT.

The fastening judger 21 calculates the above-mentioned torque variation quantity ΔT and the torque variation ratio ΔΔT. Furthermore, the fastening judger 21 judges that the fastening operation is completed when the value of the torque variation ratio ΔΔT varies from positive to negative and a value of the estimated torque T becomes larger than a predetermined lower limit value T1. When the fastening judger 21 judges that the fastening operation is completed, the fastening judger 21 outputs a signal showing that the fastening member has been fastened completely to the motor controller 30. The motor controller 30 outputs a control signal for stopping the driving of the motor to the motor driver 8 when it receives the signal from the fastening judger 21.

Figure 2:
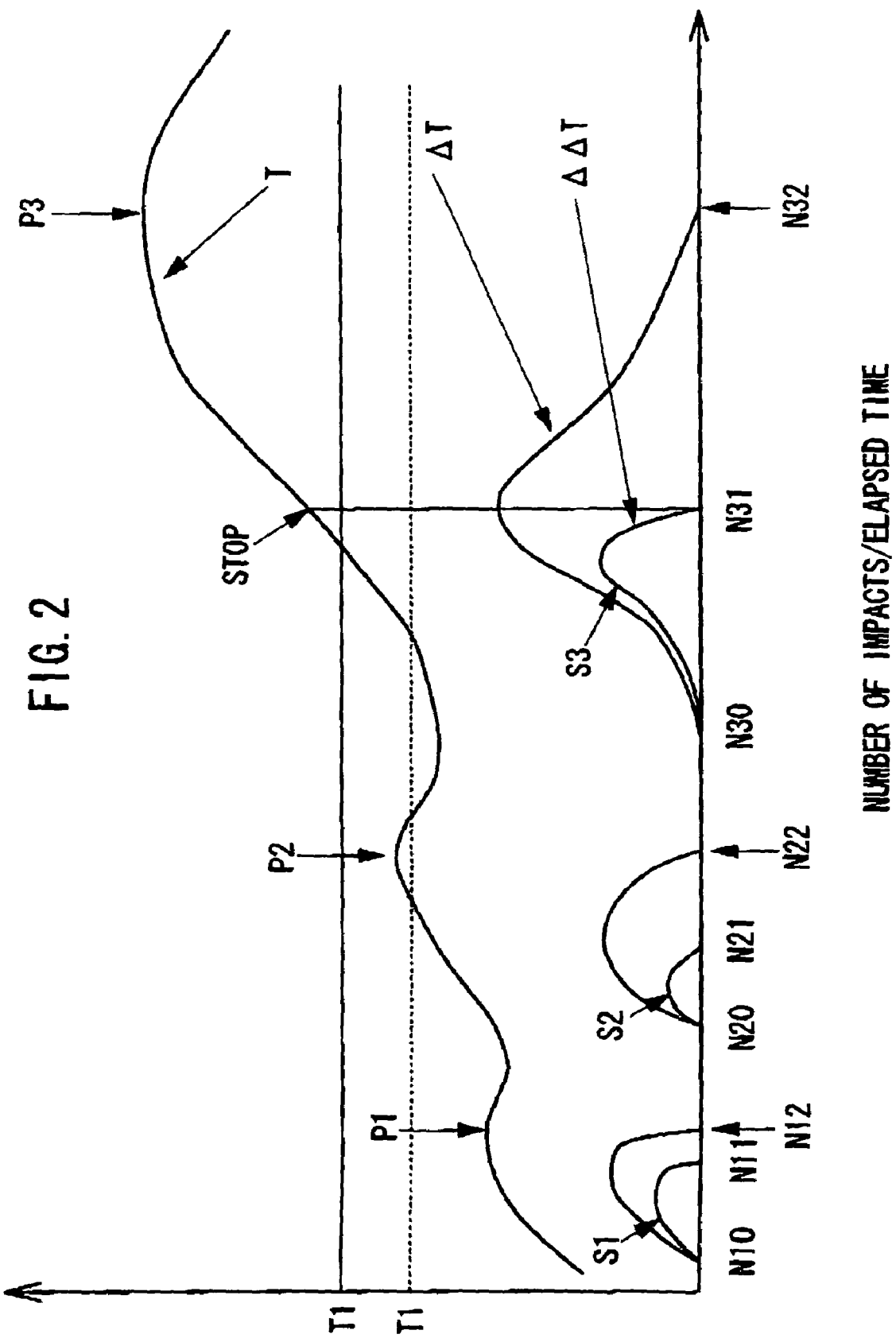
FIG. 2 is a graph showing an example of variations of estimated torque T, torque variation quantity ΔT, torque variation ratio ΔΔT and a lower limit value T1 in the fastening operation of the first embodiment.

FIG. 2 shows an example of the variations of the estimated torque T, the torque variation quantity ΔT and the torque variation ratio ΔΔT in the fastening operation of the fastening member. As can be seen from FIG. 2, a peak P3 appears on a curve designated by a symbol T showing the variation of the estimated torque T, after the fastening member has been fastened completely. A peak curve S3 designated by a symbol ΔΔT showing the variation of the torque variation ratio ΔΔT appears a little before the appearance of the peak P3. It is possible to judge that the fastening member has been fastened completely when the peak curve S3 appears. Generally, peaks P1, P2 and so on appear on the curve T due to the above-mentioned troubles in the fastening operation of the fastening member, and peak curves S1, S2 and so on further appear correspondingly. The appearance of the peak curves S1, S2, and so on causes malfunction that the driving of the motor 1 has been stopped before the fastening member is fastened completely.

In the first embodiment, it is noticed that the peak values of the peak curves S1 and S2 due to the troubles are lower than that of the peak curve S3 due to the fastening member is fastened completely, so that the lower limit value T1 is selected to be a proper value between the value of the peak P3 and the value of the peak P2. The fastening judger 21 outputs the signal for stopping the driving of the motor 1 only when not only the torque variation ratio ΔΔT varies from a positive value to a negative value but also a value of the estimated torque T becomes larger than a predetermined lower limit value T1. Thus, it is possible to prevent the malfunction for stopping of the driving of the motor 1 before the fastening member is fastened completely caused by the increase of the torque due to the trouble.

Figure 3:
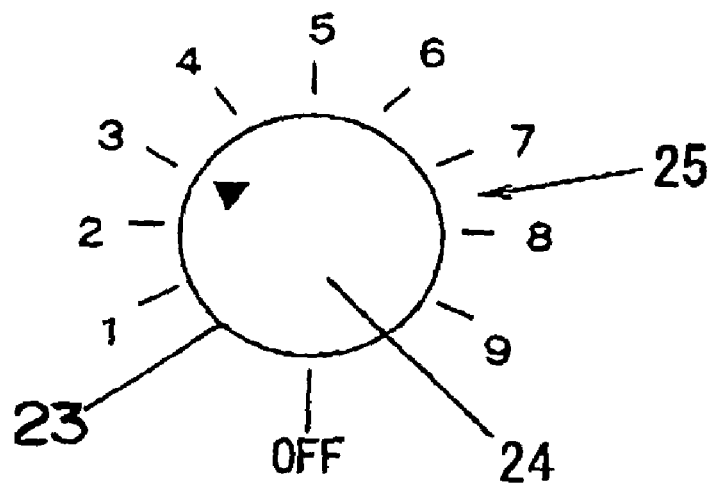
FIG. 3 is a front view of an example of a torque setter in the first embodiment.
Figure 4:
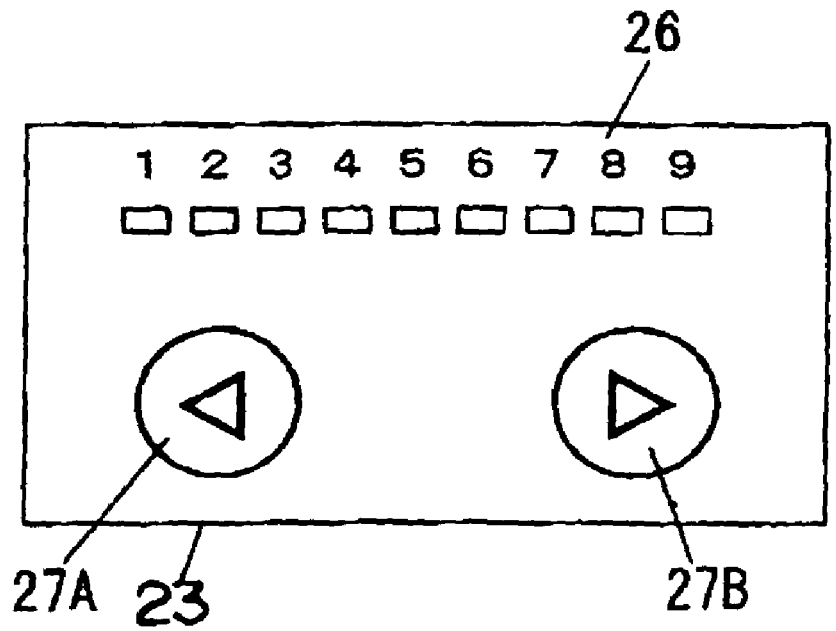
FIG. 4 is a front view of another example of the torque setter in the first embodiment.

FIGS. 3 and 4 respectively show examples of a front view of the torque setter 23. In the example shown in FIG. 3, the torque setter 23 has a rotary switch 24, a dial 25 of the rotary switch and a switching circuit (not shown) connected to the rotary switch 24 for varying a level of an output signal corresponding to an indication position of the rotary switch. The values of the lower limit value T1 of the torque can be selected among nine levels designated by numerals 1 to 9 and switching off at which the lower limit value T1 becomes infinitely grate, corresponding to the position of the dial 25.

In the example shown in FIG. 4, the torque setter 8 has an LED array 26 serving as an indicator for showing nine levels of the value of the torque, two push switches 27A and 27B and a switching circuit (not shown) connected to the LED array 26 and the push switches 27A and 27B for varying a level of the lower limit value T1 of the torque corresponding to pushing times of the push switches 27A and 27B or number of lit LEDs of the LED array 26. When the user selects the switching off at which the lower limit value T1 becomes infinitely grate, no LED is lit.

When the fastening member or the component to be fastened by the fastening member is made of a softer material or the size of the fastening member is smaller, the torque necessary for fastening the fastening member is smaller, so that it is preferable to set the lower limit value T1 smaller. Alternatively, when the fastening member or the component to be fastened by the fastening member is made of harder material or the size of the fastening member is larger, the torque necessary for fastening the fastening member is larger, so that it is preferable to set the lower limit value T1 larger. Consequently, it is possible to carry out the fastening operation suitably corresponding to the material of the fastening member or the component to be fastened by the fastening member and the size of the fastening member.

Figure 5:
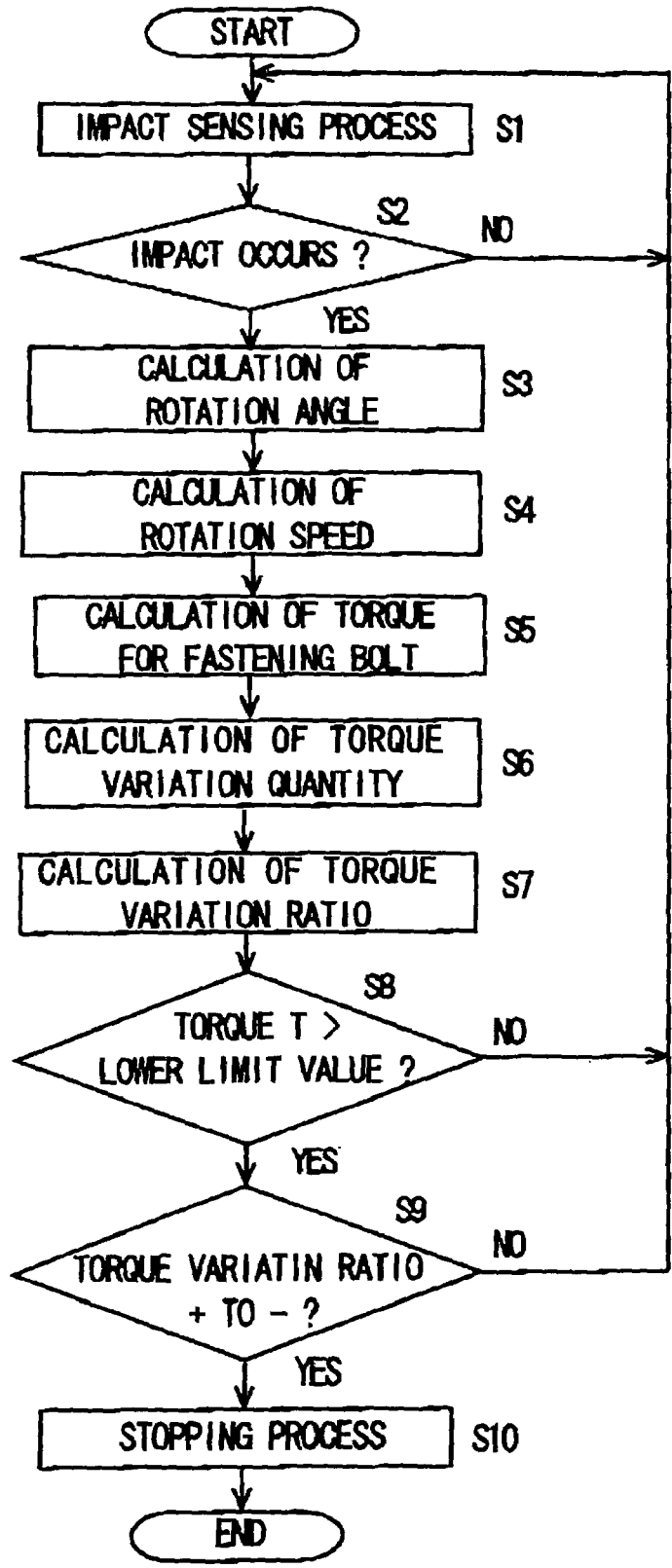
FIG. 5 is a flowchart for showing an operation of the power impact tool in the first embodiment.

Subsequently, the fastening operation of the power impact tool is described. FIG. 5 shows a basic flow of the fastening operation of the fastening member in the first embodiment, in which the fastening operation of the fastening member is completed when the value of the estimated torque T becomes larger than the predetermined lower limit value T1 and the value of the torque variation ratio ΔΔT varies from positive to negative.

When the user operates the trigger switch 9, the motor controller 30 outputs a control signal for starting the driving of the motor 1 so as to fasten the fastening member. The impact sensor 11 starts to sense the occurrence of the impact of the hammer 4 (S1). When the impact sensor 11 senses the occurrence of the impact (Yes in S2), the rotation angle calculator 13 calculates the rotation angle Δr of the anvil 5 while the hammer 4 impacts the anvil 5 (S3). The rotation angle calculator 13 further calculates the rotation speed ω of the anvil 5 at the occurrence of the impact (S4). When the rotation angle Δr and the rotation speed ω are calculated, the torque estimator 14 calculates the estimated torque T according to the above-mentioned equation (S5). The fastening judger 21 calculates the torque variation quantity ΔT and the torque variation ratio ΔΔT (S6 and S7). Subsequently, the fastening judger 21 judges whether the value of the estimated torque T for fastening the fastening member is larger than the lower limit value T1, or not (S8). When the value of the estimated torque T for fastening the fastening member is larger than the lower limit value T1 (Yes in S8), the fastening judger 21 further judges whether the value of the torque variation ratio ΔΔT varies from positive to negative, or not (S9). When the value of the torque variation ratio ΔΔT varies from positive to negative (Yes in S9), the fastening judger 21 judges that the increase of the estimated torque T is due to the fastening member is fastened completely. The fastening judger 21 executes the stopping process for stopping the driving of the motor 1 (S10). Alternatively, when the value of the estimated torque T for fastening the fastening member is not larger than the lower limit value T1 (No in S8), or when the value of the torque variation ratio ΔΔT does not vary from positive to negative (No in S9), the fastening judger 21 judges that the fastening member has not been fastened completely. The steps S1 to S9 are repeated until the fastening member is fastened completely.

Figure 6:
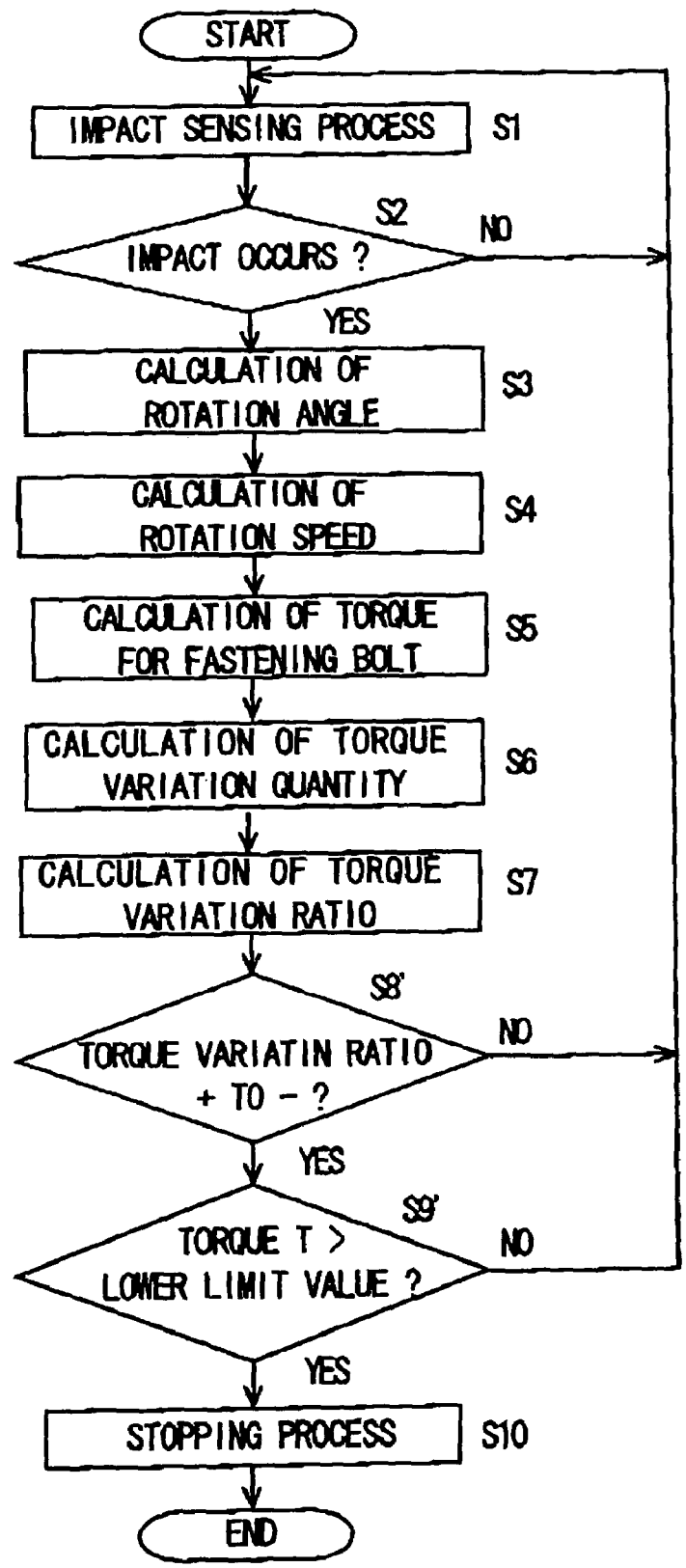
FIG. 6 is a flowchart for showing another operation of the power impact tool in the first embodiment.

With respect to the order of judgment of the fastening judger 21, it is possible that the fastening judger 21 judges the variation of the value of the torque variation ratio ΔΔT (S8') prior to the comparison of the value of the estimated torque T with the lower limit value T1 (S9'), as shown in FIG. 6.

Furthermore, with respect to the comparison of the value of the estimated torque T with the lower limit value T1, when the value of the estimated torque T is just equal to the lower limit value T1, it is possible that the fastening judger 21 judges "Yes" in the step S8 and proceeds to the step S9.

Figure 7:
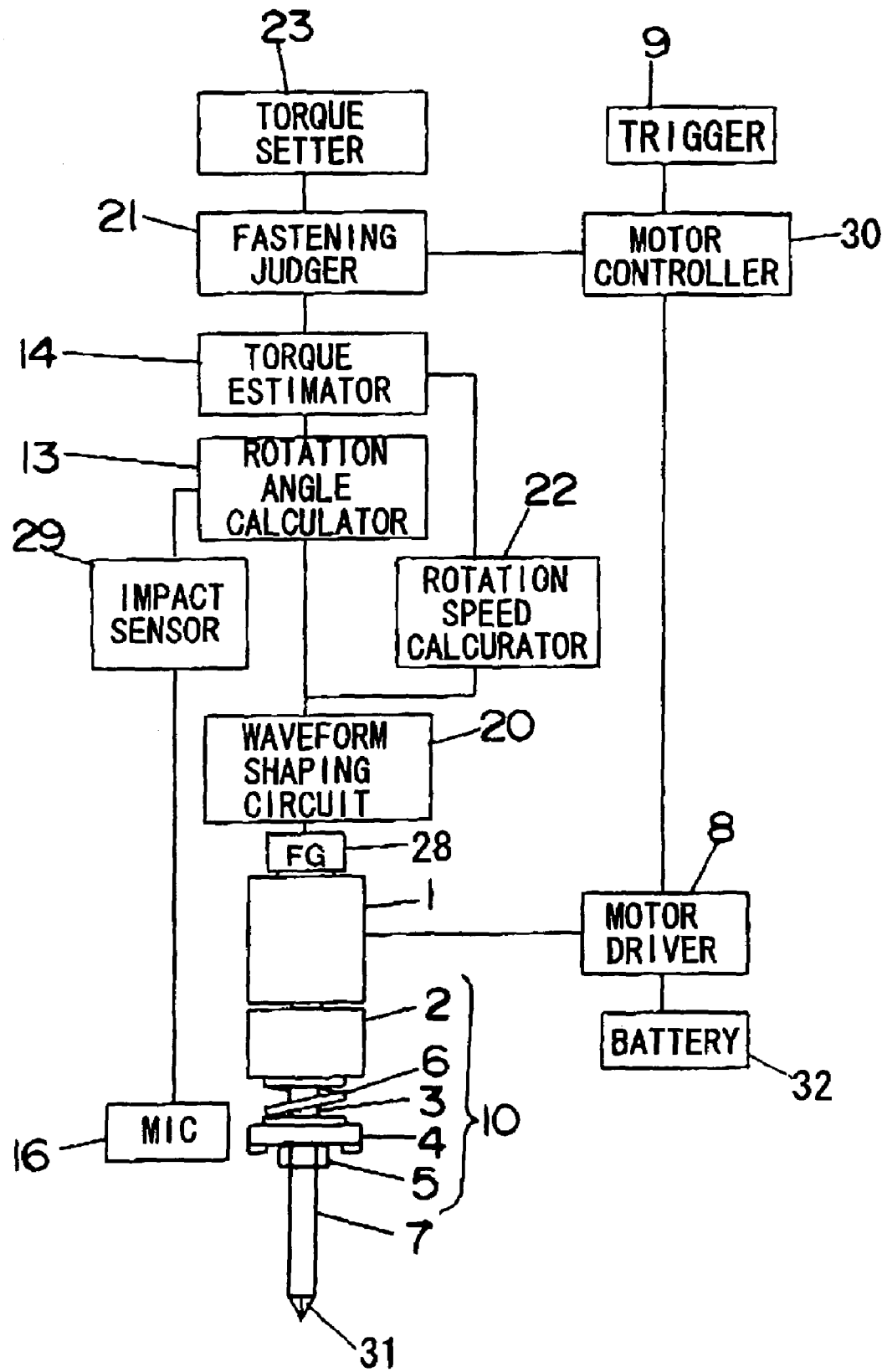
FIG. 7 is a block diagram showing another configuration of the power impact tool in the first embodiment.
Figure 8:
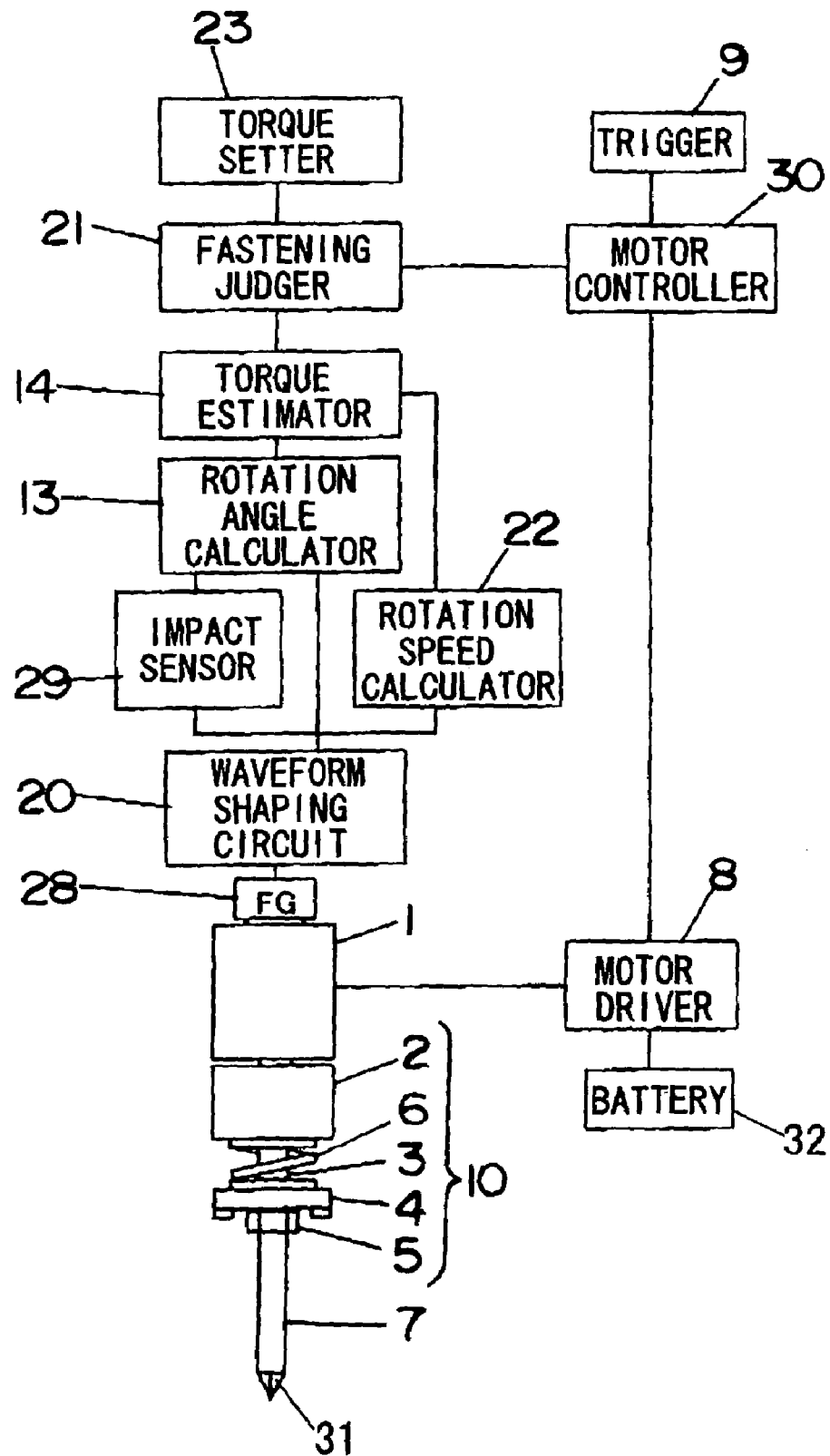
FIG. 8 is a block diagram showing still another configuration of the power impact tool in the first embodiment.

Subsequently, modified configurations of the power impact tool in the first embodiment are shown in FIGS. 7 and 8. In the modification shown in FIG. 7, the power impact tool comprises a frequency generator (FG) 28, a waveform shaping circuit 20 and a rotation speed calculator 22 for sensing the rotation speed of the motor 1 instead of the rotary encoder 19, and an impact sensor 29 connected between the microphone 16 and the rotation angle calculator 13. The frequency generator 28 outputs pulse signals corresponding to the rotation of the rotation shaft of the motor 1. The output signals of the frequency generator 28 are inputted to the rotation angle calculator 13 and a rotation speed calculator 22 via the waveform shaping circuit 20 so as to be executed the filtering process. The rotation speed calculator 22 is further connected to the torque estimator 14.

The rotation angle calculator 13 serially calculates a rotation angle Δr of the anvil 5 (or the output shaft 7) with using the following equation, when the impact sensor 29 senses each occurrence of the impact of the hammer 4 on the anvil 5 from the output signal of the microphone 16.

$$\Delta r = (\Delta RM/K) - RI$$

Hereupon, the symbol ΔRM designates the rotation angle of the rotation shaft of the motor 1, which is obtained from the output of the frequency generator 28, instead of directly sensing the rotation angle Δr of the anvil 5, the symbol K designates a reduction ratio of the reducer 2 between the rotation shaft of the motor 1 and the output shaft 7, and the symbol RI designates an idling rotation angle of the hammer 4. For example, the idling rotation angle RI becomes $2\pi/2$ when the hammer 4 impacts the anvil 5 twice in one rotation of the driving shaft 3, and $2\pi/3$ when the hammer 4 impacts the anvil 5 thrice in one rotation of the driving shaft 3.

An approximate value of the rotation speed ω of the anvil 5 at the impact of the hammer 4 can be obtained by division of the rotation speed of the motor 1 by the reduction ratio K of the reducer 2. The rotation speed calculator 22 calculates the rotation speed of the rotation shaft of the motor 1 with using the output of the frequency generator 28. The torque estimator 14 calculates the rotation speed ω of the anvil 5 at the impact of the hammer 4 with using the rotation speed of the rotation shaft of the motor 1 outputted from the rotation speed calculator 22, and further calculates the value of the estimated torque T with using the rotation speed co and the rotation angle Δr of the anvil 5 at each impact of the hammer 4 calculated by rotation angle calculator 13.

In the modification shown in FIG. 8, the output signal from the frequency generator 28 is further inputted to the impact sensor 29 via the waveform shaping circuit 20. The frequency generator 28 is used not only as a part of the rotation speed sensor, but also as a part of the impact sensor instead of the microphone 16. Specifically, the rotation speed of the motor 1 is reduced a little due to load fluctuation when the hammer 4 impacts the anvil 5, and the pulse width of the frequency signal outputted from the frequency generator 28 becomes a little wider. The impact sensor 29 senses the variation of the pulse width of the frequency signal as the occurrence of the impact Furthermore, it is possible to use an acceleration sensor for sensing the occurrence of the impact of the hammer 4 on the anvil 5.

Second Embodiment

A power fastening tool in accordance with a second embodiment of the present invention is described. The configuration of the power fastening tool in the second embodiment is essentially the same as that of the above-mentioned first embodiment except the judgment of the complete fastening of the fastening member. Thus, only the different points of the power fastening tool in the second embodiment from that in the first embodiment are described. The power impact tool illustrated in FIG. 1 is used as an example of the power fastening tool in the second embodiment. The power impact tool illustrated in FIG. 7 or 8, however, can be used as an example of the power fastening tool in the second embodiment. The same goes for the other embodiments.

Figure 9:
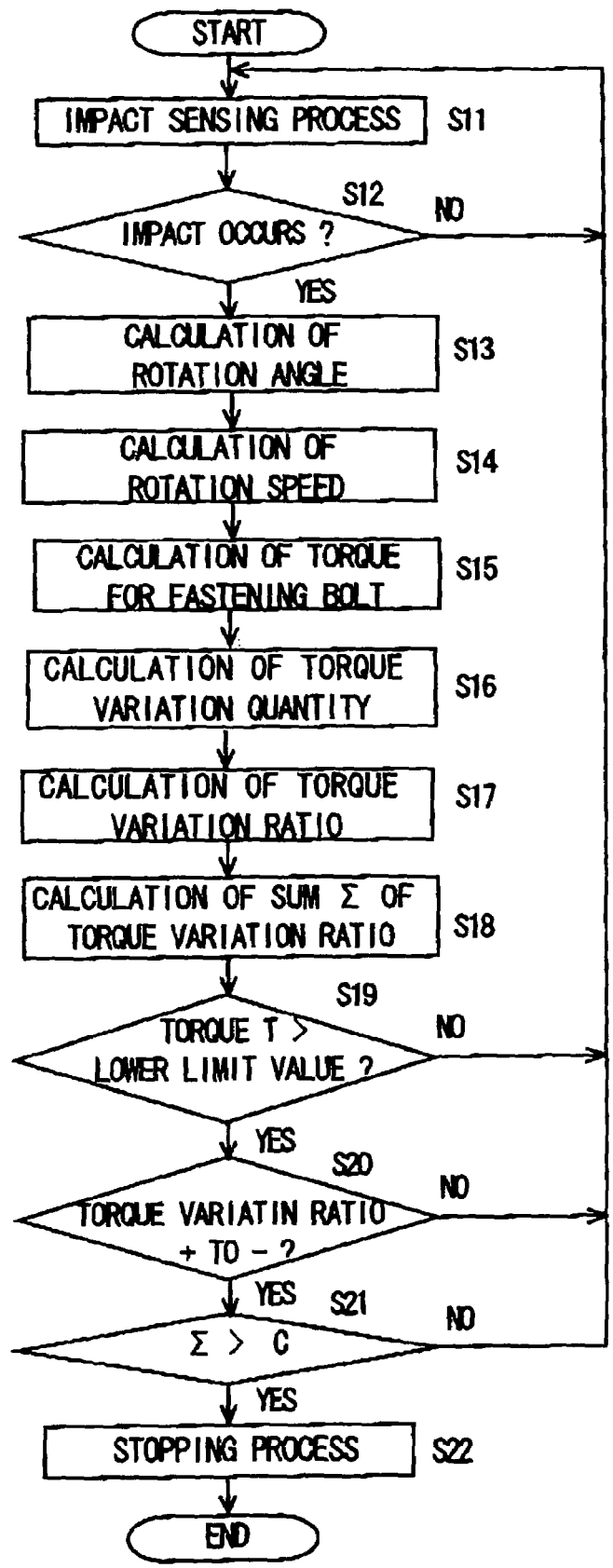
FIG. 9 is a flowchart for showing an operation of a power impact tool in accordance with a second embodiment of the present invention.

FIG. 9 shows a basic flow of the fastening operation of the fastening member in the second embodiment, in which the fastening operation of the fastening member is completed when a sum $\Sigma(\Delta\Delta T)$ of the values of the torque variation ratios ΔΔT at each impact of the hammer 4 in a term where the torque variation ratios ΔΔT take positive values becomes larger than a predetermined threshold value C, after the value of the torque variation ratio ΔΔT varies from positive to negative, and the value of the estimated torque T for fastening the fastening member becomes larger than the predetermined lower limit value T1. In FIG. 9, the steps S11 to S17 are substantially the same as the steps S1 to S7 in FIG. 5.

The fastening judger 21 further calculates the sum $\Sigma(\Delta\Delta T)$ of the values of the torque variation ratios ΔΔT at each impact of the hammer 4 in the term where the torque variation ratios ΔΔT take positive values (S18). Subsequently, the fastening judger 21 judges whether the value of the estimated torque T for fastening the fastening member is larger than the lower limit value T1, or not (S19). When the value of the estimated torque T for fastening the fastening member is larger than the lower limit value T1 (Yes in S19), the fastening judger 21 further judges whether the value of the torque variation ratio ΔΔT varies from positive to negative, or not (S20). When the value of the torque variation ratio ΔΔT varies from positive to negative (Yes in S20), the fastening judger 21 still further judges whether the sum $\Sigma(\Delta\Delta T)$ of the values of the torque variation ratios ΔΔT is larger than a predetermined threshold value C, or not (S21). When the sum $\Sigma(\Delta\Delta T)$ is larger than the threshold value C (Yes in S21), the fastening judger 21 judges that the increase of the estimated torque T is due to the fastening member is fastened completely. The fastening judger 21 executes the stopping process for stopping the driving of the motor 1 (S22). Alternatively, when the value of the estimated torque T for fastening the fastening member is not larger than the lower limit value T1 (No in S19), when the value of the torque variation ratio ΔΔT does not vary from positive to negative (No in S20), or when the sum Σ(ΔΔT) is not larger than the threshold value C (No in S21), the fastening judger 21 judges that the fastening member has not been fastened completely. The steps S11 to S21 are repeated until the fastening member is fastened completely.

Figure 10:
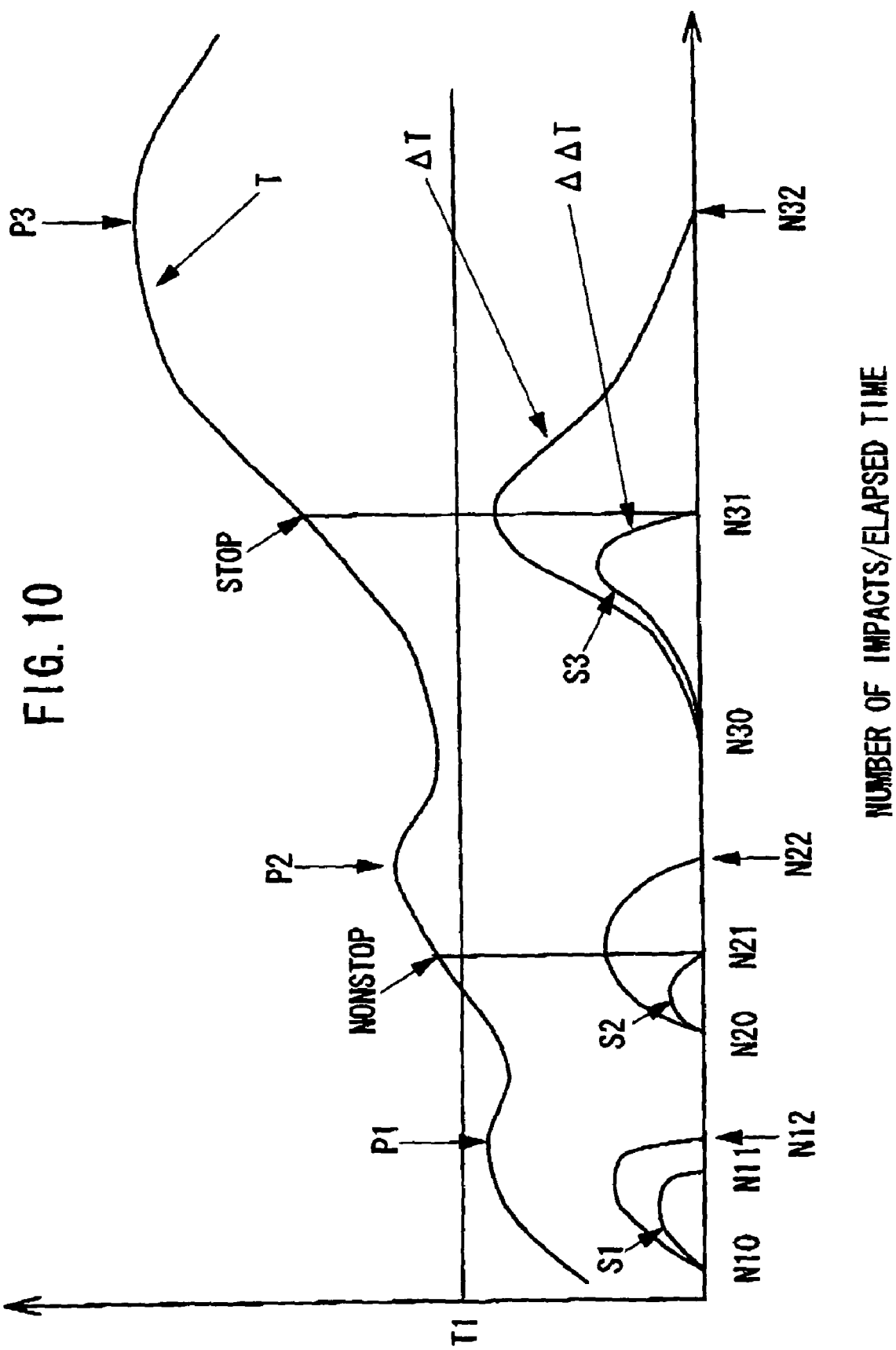
FIG. 10 is a graph showing an example of variations of estimated torque T, torque variation quantity ΔT, torque variation ratio ΔΔT and a lower limit value T1 in the fastening operation of the second embodiment.

In the above-mentioned example shown in FIG. 2, the lower limit value T1 is properly set between the values of the peaks P3 and P2. The value of the peak P2 due to trouble, however, is uncertain, so that the lower limit value T1 could be smaller than the value of the peak P2, as shown in FIG. 10.

In the second embodiment, it is noticed that the sum Σ(ΔΔT) of values of the torque variation ratios ΔΔT occurred at each impact of the hammer 4 in the term in which the torque variation ratios ΔΔT take positive values due to the trouble becomes smaller than that due to the fastening member is fastened completely, since the peak values of the peak curves S1 and S2 due to the troubles are lower than that of the peak curve S3 due to the fastening member is fastened completely. In this case, the threshold value C is defined to be larger than the sum Σ(ΔΔT) of values of the torque variation ratios ΔΔT of the peak curves S1 and S2 due to the troubles and smaller than the sum Σ(ΔΔT) of values of the torque variation ratios ΔΔT of the peak curve S3 due to the fastening member is fastened completely.

Figure 11:
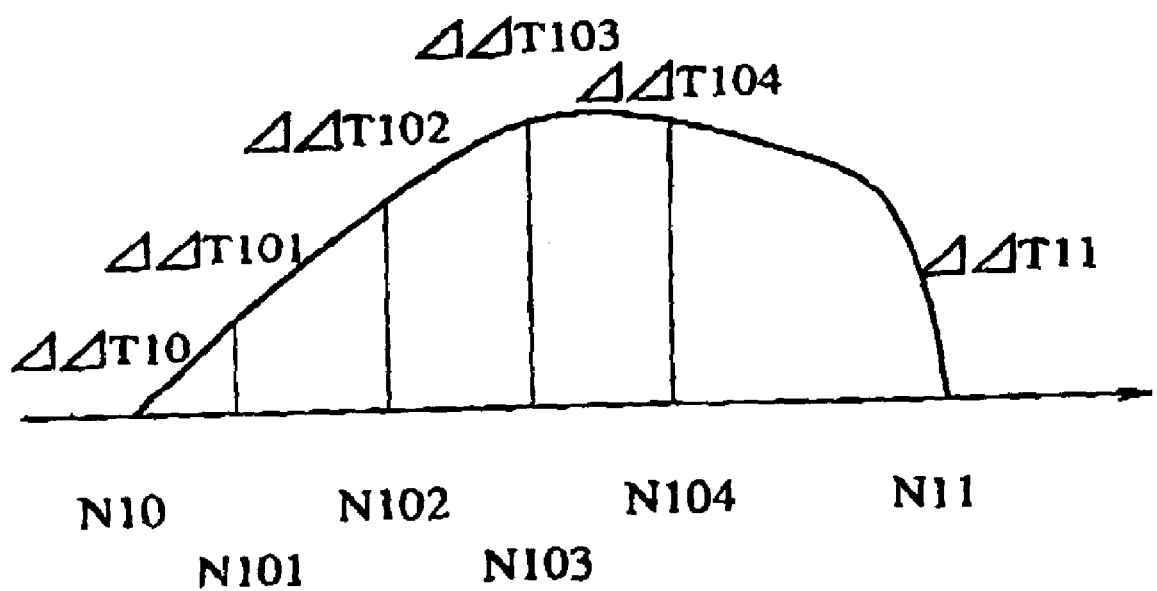
FIG. 11 is a graph showing an enlarged peak curve S1 in FIG. 10.

In the case shown in FIG. 11 which illustrates the peak curve S1 largely, the sum Σ(ΔΔT)=ΔΔT10+ΔΔT101+ΔΔT102+ . . . +ΔΔT11. It, however, is not limited to use the sum Σ(ΔΔT) of values of the torque variation ratios ΔΔT occurred at each impact of the hammer 4 in the term in which the torque variation ratios ΔΔT take positive values. It is possible to use an integration value of the torque variation ratio ΔΔT in the term in which the torque variation ratios ΔΔT continuously take positive values as the reference index.

By such a configuration, it is possible to stop the driving of the motor 1 just when the fastening member is fastened completely without malfunction even when the value of the peak of the variation of the estimated torque T due to the trouble is larger than the lower limit value T1 of the torque.

It is possible that the predetermined threshold value C is automatically set corresponding to the lower limit value T1 of the torque set by the torque setter 23. Specifically, the threshold value C is, for example, calculated by a multiplication of a number of the indication of the dial of the torque setter 23 and a coefficient in a manner so that the larger the lower limit value T1 becomes, the larger the value of the threshold value C becomes. Thus, it is possible to judge the complete fastening of the fastening member by the most suitable threshold value C, without setting the threshold value C corresponding to the kind of the work operation.

Third Embodiment

In the third embodiment, the fastening judger 21 has two conditions for judging the complete fastening of the fastening member corresponding to the kinds of work operation.

Figure 12:
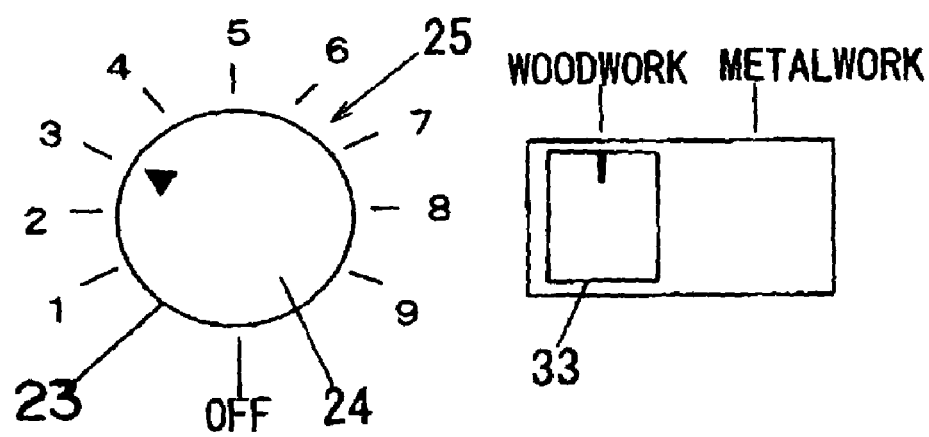
FIG. 12 is a front view of an example of a torque setter further having a work selection switch in accordance with a third embodiment of the present invention.

FIG. 12 shows an example of a front view of the torque setter 23. In comparison with the example shown in FIG. 3, the torque setter 23 further has a work selection switch 33 for selecting a kind of the work operation, which outputs a signal corresponding to a selection by the user. In this example, the work selection switch 33 can select between the woodwork and the metalwork.

Figure 13:
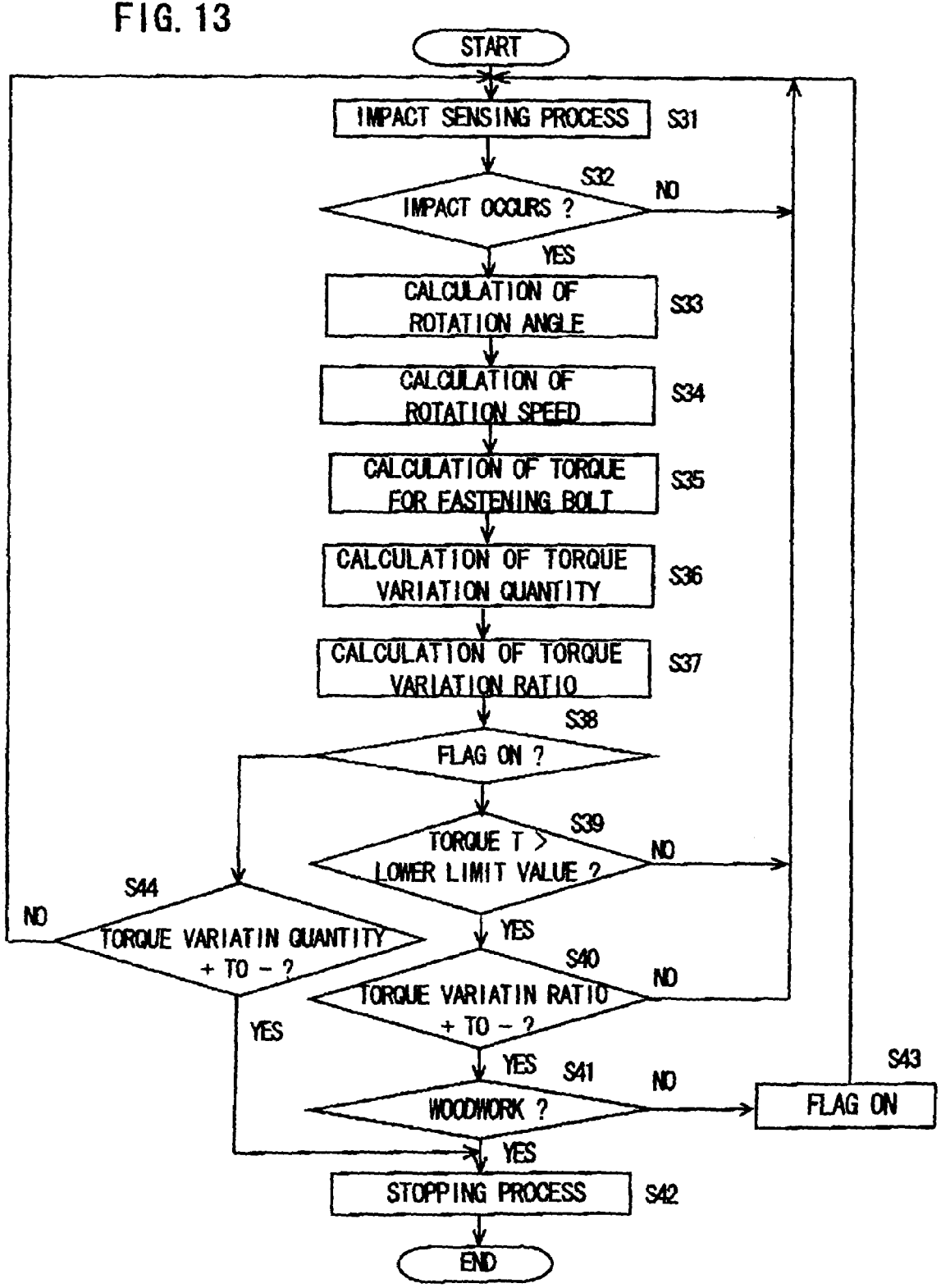
FIG. 13 is a flowchart for showing an operation of the power impact tool in the third embodiment.

FIG. 13 shows a basic flow of the fastening operation of the fastening member in the third embodiment, in which the fastening operation of the fastening member is completed when the value of the estimated torque T for fastening the fastening member becomes larger than the lower limit value T1 of the torque and the value of the torque variation ratio ΔΔT varies from positive to negative in case of the woodwork, and when the value of the torque variation quantity ΔT varies from positive to negative after the value of the estimated torque T for fastening the fastening member becomes larger than the lower limit value T1 of the torque and the value of the torque variation ratio ΔΔT varies from positive to negative in case of the metalwork. In FIG. 13, the steps S31 to S37 are substantially the same as the steps S1 to S7 in FIG. 5.

The fastening judger 21 further judges whether a flag has been turned on, or not (S38). The flag has not been turned on at the start of this flow. The details of the flag will be described below. When the flag has been turned on, the fastening judger 21 further judges whether the value of the estimated torque T for fastening the fastening member becomes larger than the lower limit value T1 of the torque, or not (S39). When the value of the estimated torque T for fastening the fastening member is larger than the lower limit value T1 (Yes in S39), the fastening judger 21 still further judges whether the value of the torque variation ratio ΔΔT varies from positive to negative, or not (S40). When the value of the torque variation ratio ΔΔT varies from positive to negative (Yes in S40), the fastening judger 21 still further judges whether the woodwork is selected in the work selection switch 33, or not (S41). When the woodwork is selected in the work selection switch 33, (Yes in S41), the fastening judger 21 judges that the increase of the estimated torque T is due to the fastening member is fastened completely. The fastening judger 21 executes the stopping process for stopping the driving of the motor 1 (S42).

Alternatively, when the metalwork is selected in the work selection switch 33, (No in S41), the fastening judger 21 turns on the flag (S43), and the flow is returned to the step S3 1. After the steps S31 to S37 are repeated, the fastening judger 21 judges whether the flag has been turned on, or not, again (S38). At this time, since the flag has been turned on in the step S38, the fastening judger 21 further judges whether the value of the torque variation quantity ΔT varies from positive to negative, or not (S44). When the value of the torque variation quantity ΔT varies from positive to negative (Yes in S44), the fastening judger 21 judges that the increase of the estimated torque T is due to the fastening member is fastened completely. The fastening judger 21 executes the stopping process for stopping the driving of the motor 1 (S42).

Alternatively, when the value of the estimated torque T for fastening the fastening member is not larger than the lower limit value T1 (No in S39), when the value of the torque variation ratio ΔΔT does not vary from positive to negative (No in S40), or when the value of the torque variation quantity ΔT does not is vary from positive to negative (No in S44), the fastening judger 21 judges that the fastening member has not been fastened completely. The steps S31 to S44 except the step S42 are repeated until the fastening member is fastened completely.

Figure 14:
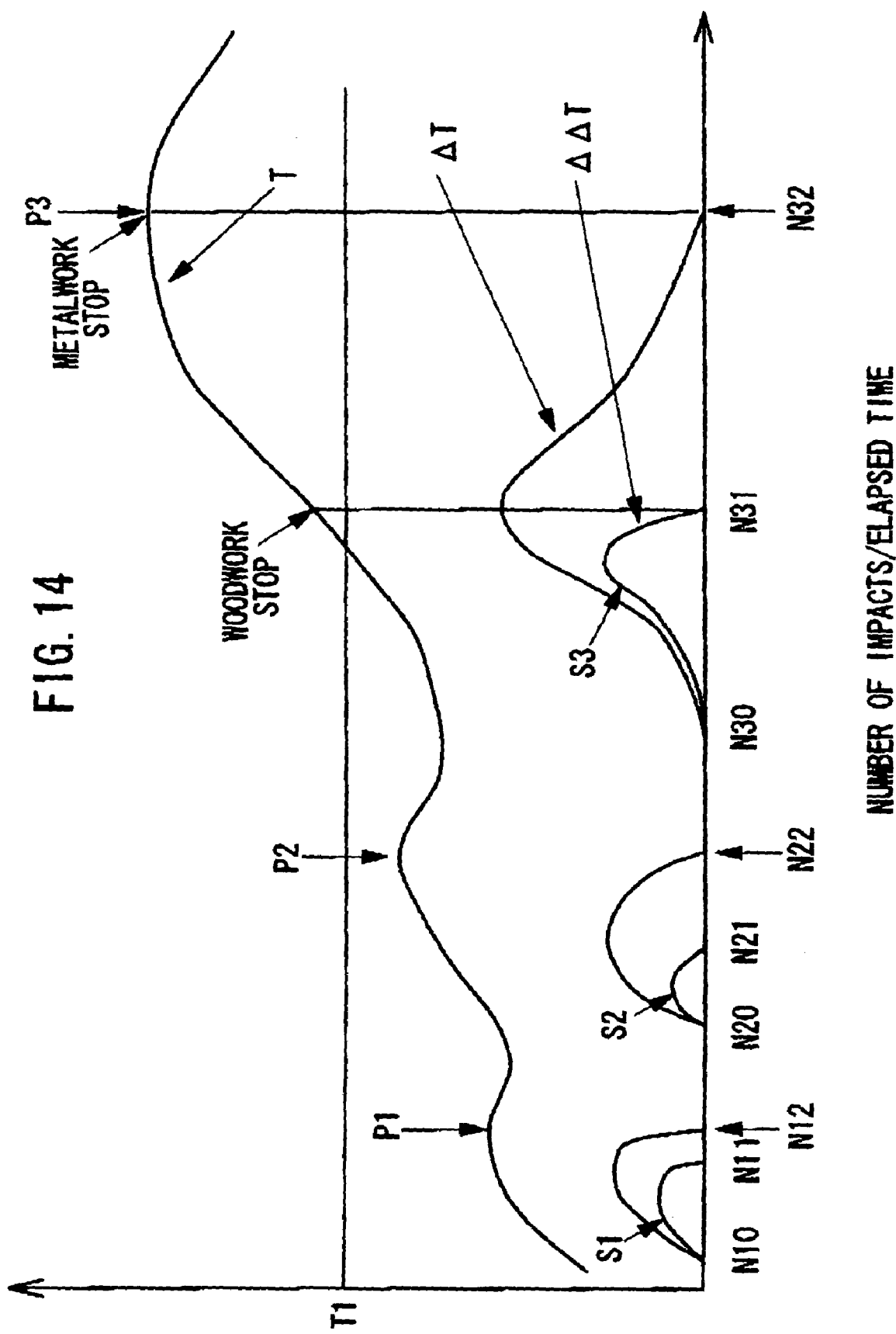
FIG. 14 is a graph showing an example of a difference of values of the estimated torque T when fastening operations are completed in the cases of woodwork and metalwork in the third embodiment.

FIG. 14 shows the difference of the values of the estimated torque T when the fastening operations are completed in the cases of the woodwork and the metalwork. In the woodwork, when the fastening member such as a screwnail is fastened till the fastening torque reaches to the peak P3, the thread on the fastening member could be stripped or a crack could occur on a wood component to be fastened by the fastening member. Thus, it is preferable to stop the fastening operation of the fastening member before the torque for fastening the fastening member reaches to the peak. Alternatively, in the metalwork, the damage rarely occurs on the metal component to be fastened by the fastening member, even when the fastening member is fastened until the value of the torque reaches to the peak.

It is possible further to add the condition that the sum $\Sigma(\Delta\Delta T)$ of the values or the integration value of the torque variation ratios $\Delta\Delta T$ at each impact of the hammer 4 in a term where the torque variation ratios $\Delta\Delta T$ take positive values becomes larger than a predetermined threshold value C, further to the conditions that the value of the torque variation ratio $\Delta\Delta T$ varies from positive to negative, and the value of the estimated torque T for fastening the fastening member becomes larger than the predetermined lower limit value T1, for judging that the fastening operation of the fastening member is completed, similar to the above-mentioned second embodiment.

Figure 15:
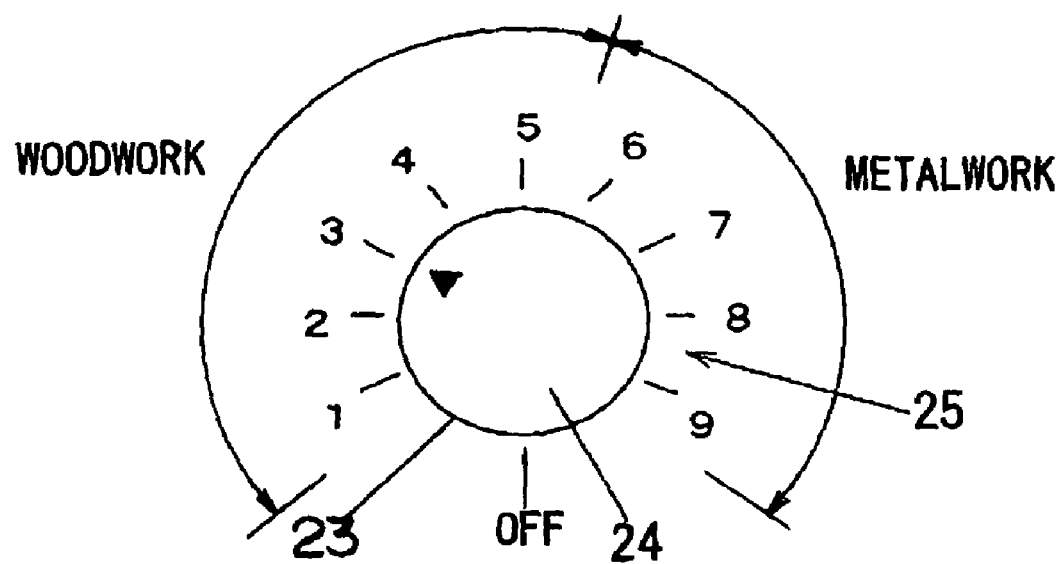
FIG. 15 is a front view of another example of the torque setter in the third embodiment.

FIG. 15 shows another example of a front view of the torque setter 23. It is possible that the woodwork is automatically selected when the lower limit value T1 of the torque set in the torque setter 23 is equal to or smaller than a predetermined value corresponding to, for example, the level five. When the lower limit value T1 of the torque is equal to or larger than the value corresponding to the level six, the metalwork is automatically selected.

Fourth Embodiment

In the fourth embodiment, an upper limit value T2 of the torque can be set in the torque setter 23, and the lower limit value T1 is automatically set corresponding to the level of the upper limit value T2. When the value of the estimated torque T calculated by the torque estimator 14 becomes larger than the upper limit value T2, the driving of the motor 1 is forcibly stopped, even though the fastening judger 21 could not judge the complete fastening of the fastening member.

Figure 16:
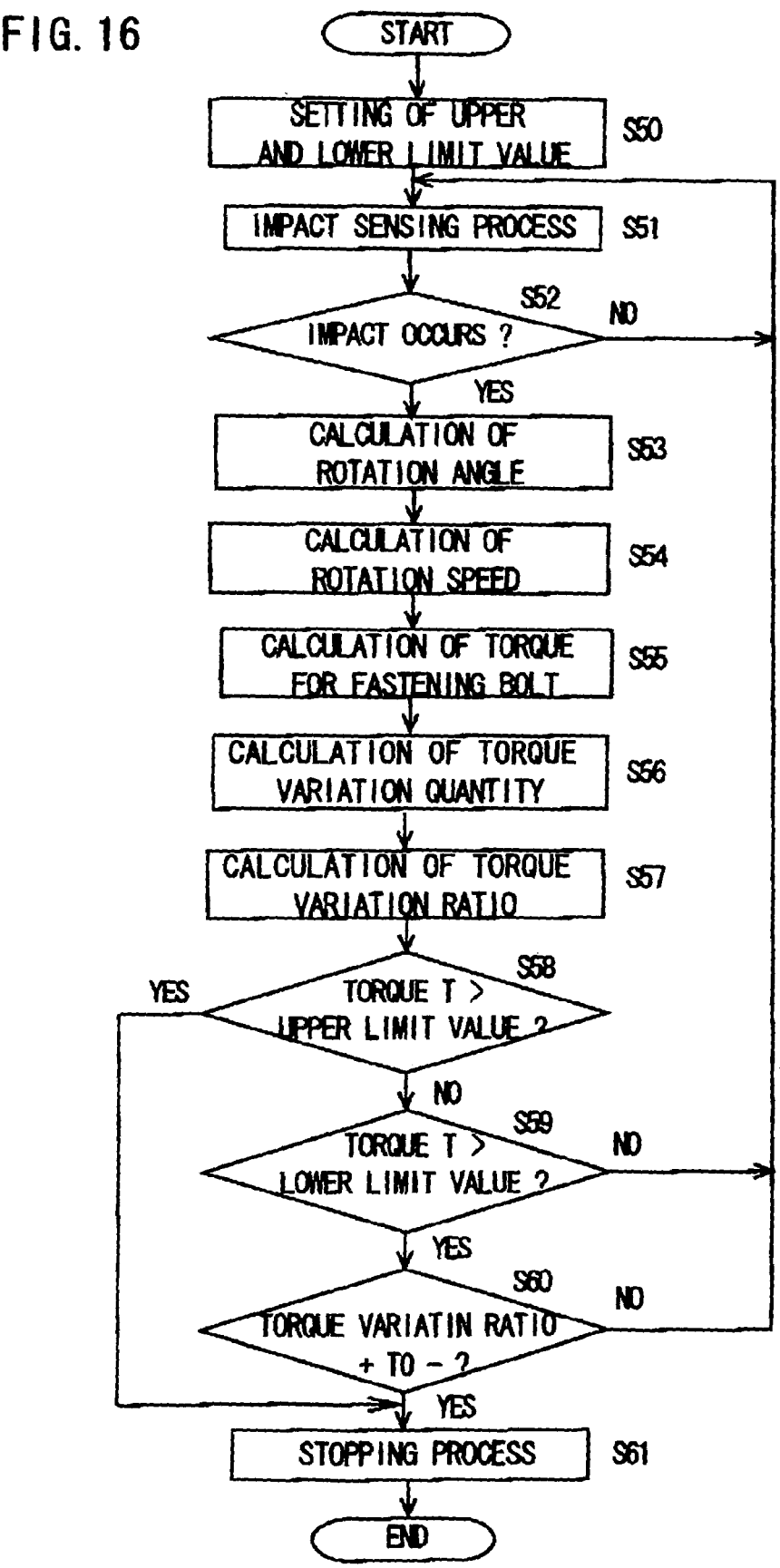
FIG. 16 is a flowchart for showing an operation of a power impact tool in accordance with a fourth embodiment of the present invention.

FIG. 16 shows a basic flow of the fastening operation of the fastening member in the third embodiment, in which the value of the estimated torque T for fastening the fastening member is compared with not only the lower limit value T1 of the torque but also the upper limit value T2, and the fastening operation of the fastening member is completed not only when the value of the estimated torque T for fastening the fastening member becomes larger than the lower limit value T1 of the torque and the value of the torque variation ratio $\Delta\Delta T$ varies from positive to negative in case of the woodwork, but also when the value of the estimated torque T becomes larger than the upper limit value T2. In FIG. 16, the steps S51 to S57 are substantially the same as the steps S1 to S7 in FIG. 5.

The lower limit value T1 is calculated corresponding to the upper limit value T2 set in the torque setter 23, prior to the start of the impact sensing operation (S50). It is possible that the calculation of the upper limit value T2 is executed in the torque setter 23 or the fastening judger 21.

The fastening judger 21 further judges whether the value of the estimated torque T for fastening the fastening member becomes larger than the upper limit value T2 of the torque, or not (S58). When the value of the estimated torque T for fastening the fastening member is larger than the upper limit value T2 (Yes in S58), the fastening judger 21 executes the stopping process for stopping the driving of the motor 1, with no relation to the judgment that the fastening member is fastened completely (S61).

Alternatively, when the value of the estimated torque T for fastening the fastening member is not larger than the upper limit value T2 (No in S58), the fastening judger 21 further judges whether the value of the estimated torque T for fastening the fastening member is larger than the lower limit value T1, or not (S59). When the value of the estimated torque T for fastening the fastening member is larger than the lower limit value T1 (Yes in S59), the fastening judger 21 still further Judges whether the value of the torque variation ratio $\Delta\Delta T$ varies from positive to negative, or not (S60). When the value of the torque variation ratio $\Delta\Delta T$ varies from positive to negative (Yes in S60), the fastening judger 21 judges that the increase of the estimated torque T is due to the fastening member is fastened completely. The fastening judger 21 executes the stopping process for stopping the driving of the motor 1 (S61).

Alternatively, when the value of the estimated torque T for fastening the fastening member is not larger than the lower limit value T1 (No in S59), or when the value of the torque variation ratio $\Delta\Delta T$ does not vary from positive to negative (No in S60), the fastening judger 21 judges that the fastening member has not been fastened completely. The steps S51 to S60 are repeated until the fastening member is fastened completely.

Figure 17:
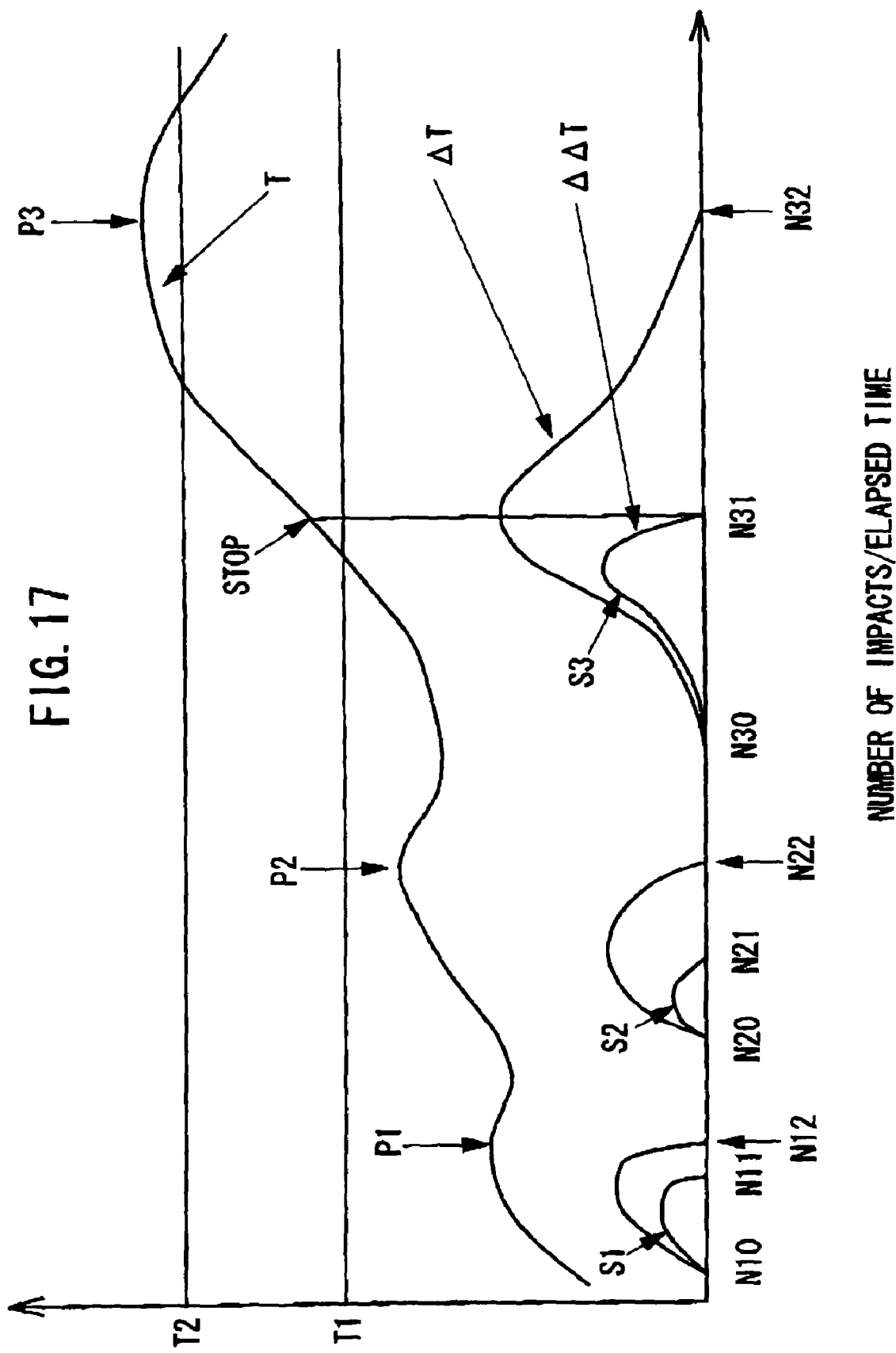
FIG. 17 is a graph showing an example of a normal control operation in which driving of a motor is normally stopped when a fastening judger judges that a fastening member is fastened completely in the fourth embodiment.
Figure 18:
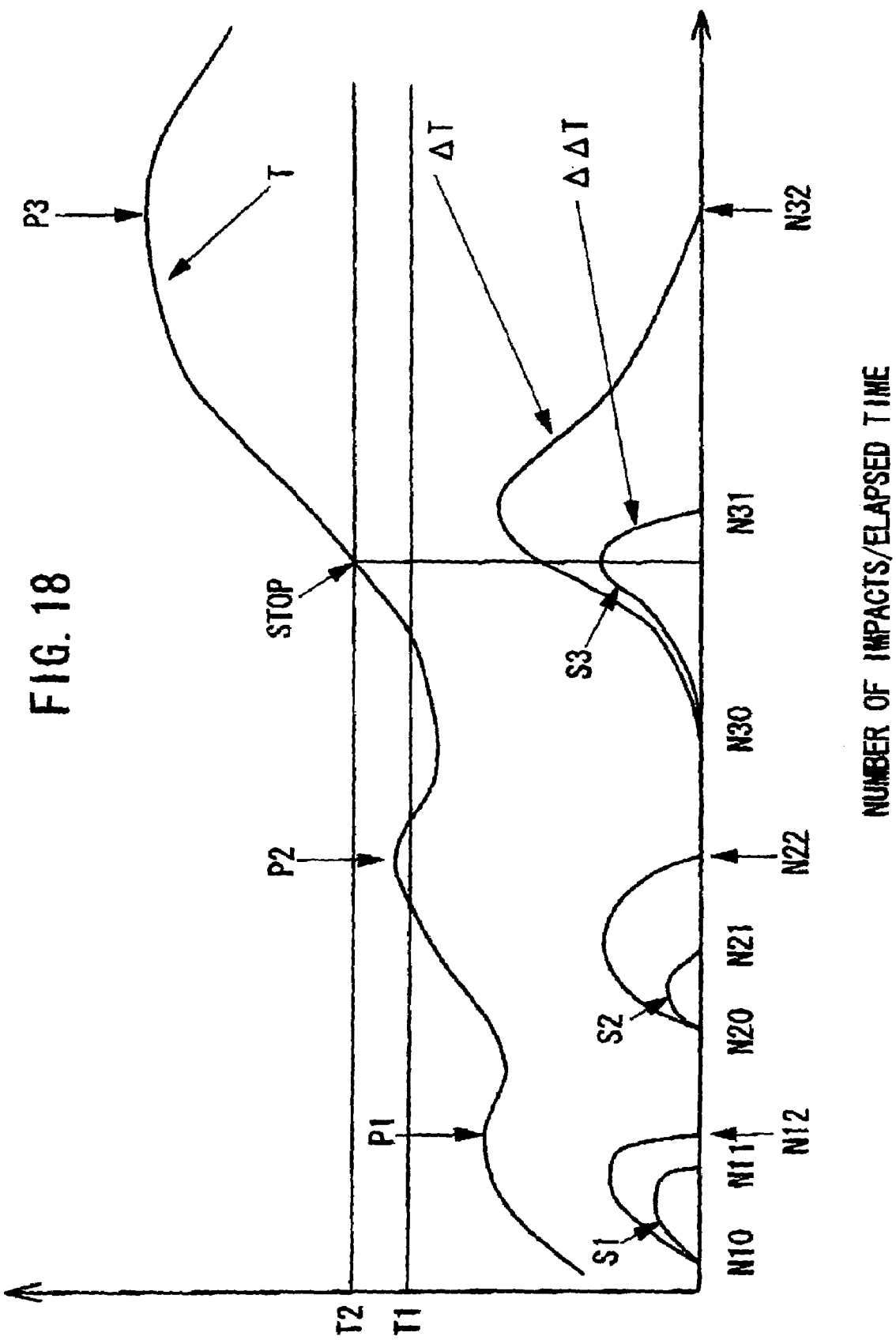
FIG. 18 is a graph showing an example of an upper limit control operation in which driving of a motor is abnormally stopped when a value of the estimated torque T for fastening the fastening member becomes larger than an upper limit value T2 of the torque in the fourth embodiment.

FIG. 17 shows an example that the driving of the motor 1 is normally stopped, since the fastening judger 21 judges that the fastening member is fastened completely. FIG. 18 shows another example that the driving of the motor 1 is abnormally stopped, since the fastening judger 21 judges that the value of the estimated torque T for fastening the fastening member becomes larger than the upper limit value T2 of the torque.

With respect to the relation between the lower limit value T1 and the upper limit value T2 of the torque, it is possible to calculate the lower limit value T1 in a manner so that a ratio of the lower limit value T1 against the upper limit value T2 becomes constant, for example, 50% (T1/T2=50%). Alternatively, it is possible to vary the ratio of the lower limit value T1 against the upper limit value T2 corresponding to the level of the lower limit value T1, as shown in FIG. 19. In the latter case, the higher the level of the upper limit value T2 becomes, the smaller the ratio of the lower limit value T1 against the upper limit value T2 becomes.

Figure 20:
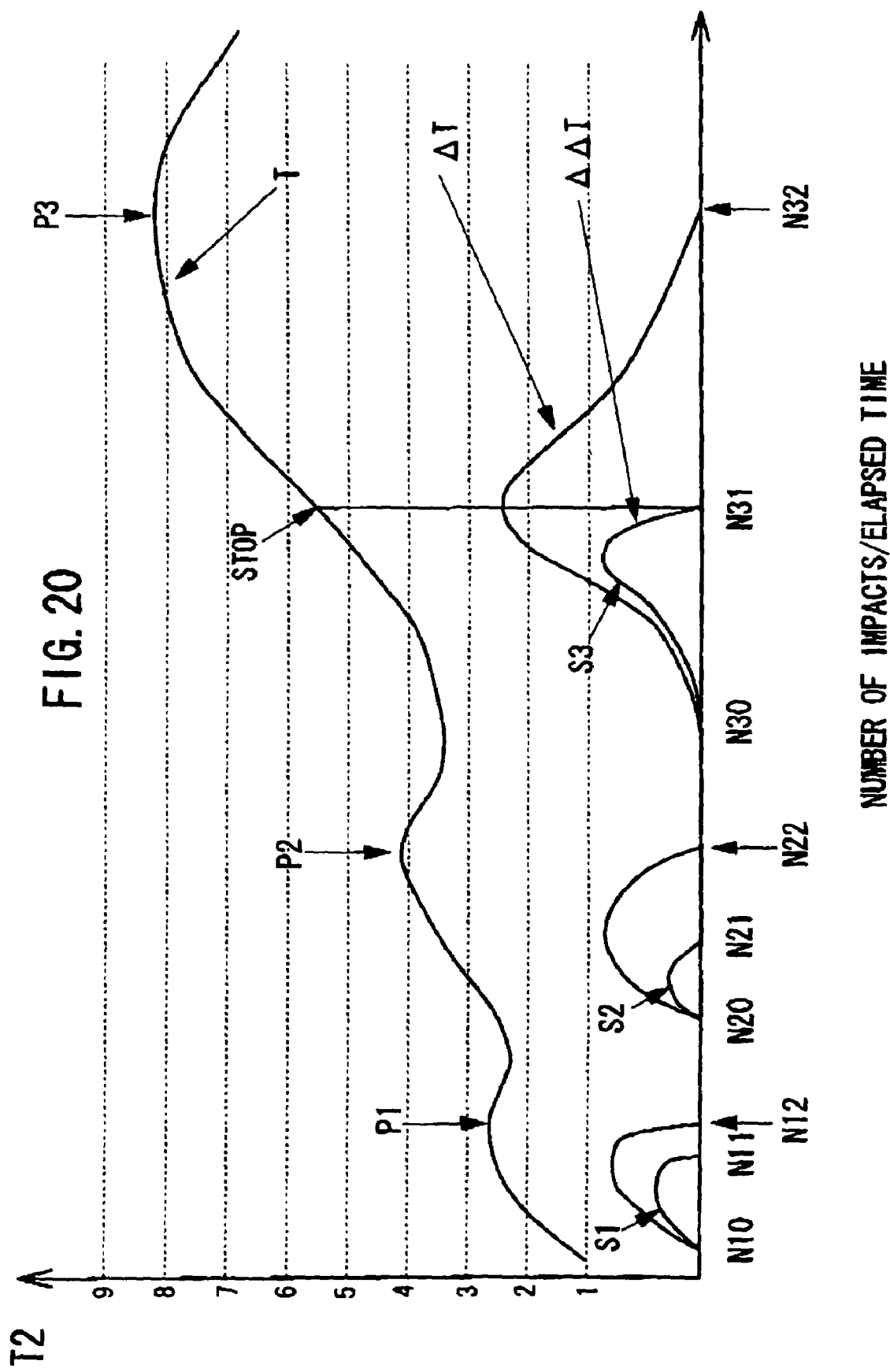
FIG. 20 is a graph showing another example of an upper limit control operation in which a plurality of levels of the upper limit values T2 is previously set in the fourth embodiment.

Furthermore, it is possible that a plurality of levels of the upper limit values T2 is previously set in the torque setter 23, for example level six, as shown in FIG. 20, and the lower limit value T1 is set one level lower than the upper limit value T2, for example level five. By such a configuration, it is possible to omit the calculation of the lower limit value T1.

It is possible further to add the condition that the sum $\Sigma(\Delta\Delta T)$ of the values or the integration value of the torque variation ratios $\Delta\Delta T$ at each impact of the hammer 4 in a term where the torque variation ratios $\Delta\Delta T$ take positive values becomes larger than a predetermined threshold value C, further to the conditions that the value of the torque variation ratio $\Delta\Delta T$ varies from positive to negative, and the value of the estimated torque T for fastening the fastening member becomes larger than the predetermined lower limit value T1, for judging that the fastening operation of the fastening member is completed, similar to the above-mentioned second embodiment.

Fifth Embodiment

In s fifth embodiment, the fastening judger 21 can switch the driving control of the motor 1 between a normal control mode with using the lower limit value T1 of the torque and an upper limit control mode with using only the upper limit value T2 of the torque.

Figure 21:
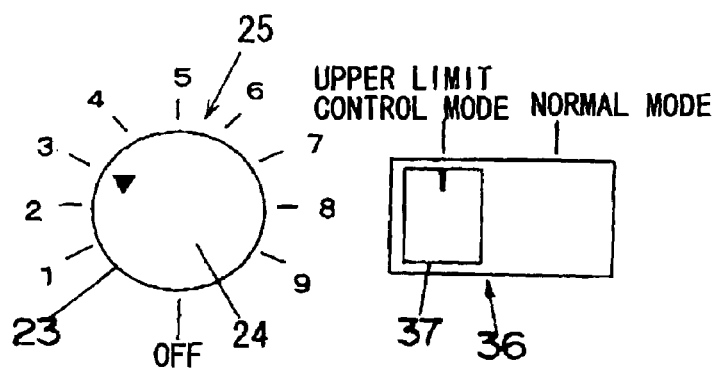
FIG. 21 is a front view of an example of the torque setter in accordance with a fifth embodiment of the present invention.

FIG. 21 shows an example of a front view of the torque setter 23. The torque setter 23 further has a mode selection switch 36 for selecting alternative of the normal control mode and the upper limit control mode corresponding to a position of a knob 37. When the normal control mode is selected, the torque setter 23 is used for setting the lower limit value T1. Alternatively, when the upper limit control mode is selected, the torque setter 23 is used for setting the upper limit value T2.

When the normal control mode is selected, the operation of the power impact tool is substantially the same as that in the above-mentioned first embodiment. Alternatively, when the upper limit control mode is selected, the fastening judger 21 only judges whether the value of the estimated torque T for fastening the fastening member becomes larger than the upper limit value T2, or not, without using the lower limit value T1. The normal control mode is suitable for a high torque fastening operation such as a metalwork in which the component to be fastened by the fastening member is rarely damaged by the fastening operation. The upper limit control mode is suitable for a low torque fastening operation such as a woodwork in which the thread on the fastening member could be stripped or a crack could occur on the component to be fastened by the fastening member.

Figure 22:
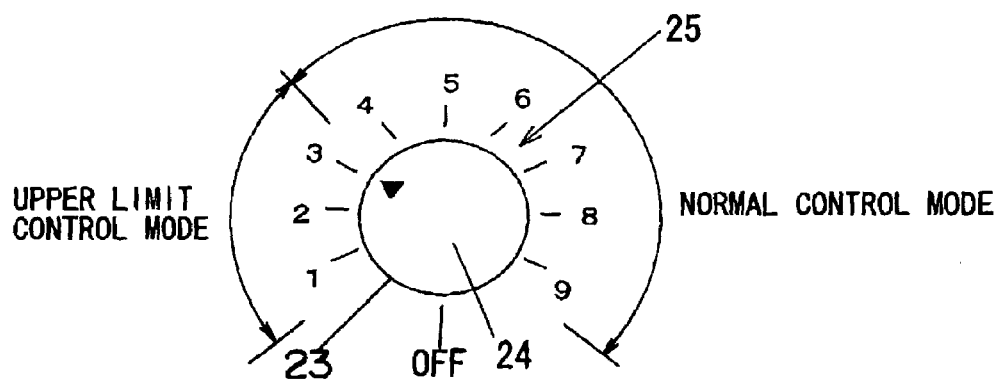
FIG. 22 is a front view of another example of the torque setter in the fifth embodiment.

FIG. 22 shows another example of a front view of the torque setter 23. In this example, the normal control mode and the upper limit control mode is automatically switched corresponding to the position of the rotary switch 24 on the dial 25. When the rotary switch 24 is positioned at one of the levels one to three, the fastening judger 21 automatically selects the upper limit control mode. When the rotary switch 24 is positioned at one of the levels four to nine, the fastening judger 21 automatically selects the normal control mode.

Sixth Embodiment

In a sixth embodiment, the lower limit value T1 and/or the upper limit value T2 are/is set corresponding to the selection of the work operation and the size of the fastening member.

Figure 23:
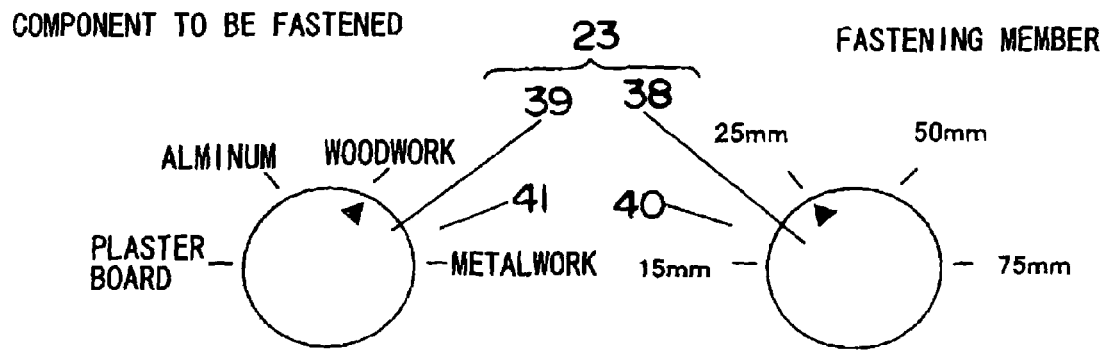
FIG. 23 is a front view of an example of the torque setter in accordance with a sixth embodiment of the present invention.

FIG. 23 shows an example of a front view of the torque setter 23. The torque setter 23 has a first and a second rotary switches 38 and 39, two dials of the rotary switches 40 and 41 and a switching circuit (not shown) connected to the rotary switches 38 and 39 for varying a level of an output signal corresponding to the combination of the indication positions of the rotary switches 38 and 39 on the dials 40 and 41. The first rotary switch 38 is used for selecting the size of the fastening member, and the second rotary switch 39 is used for selecting a kind of materials of a component to be fastened by the fastening member or the kind of the work operation. FIG. 24 shows a table showing an example of the levels of the lower limit value T1 and/or the upper limit value T2 of the torque corresponding to the materials of the component to be fastened by the fastening member or the kind of the work operation and the size of the fastening member. It is assumed that the user sets the first rotary switch 38 to indicate the size 25 mm and the second rotary switch 39 to indicate the woodwork. The switching circuit outputs a signal corresponding to the reference value of the torque at the level four, so that the fastening judger 21 sets the lower limit value T1 and/or the upper limit value T2 suitable for the woodwork.

Other Modification

In the above-mentioned embodiments, the power impact tools are described as examples of the power fastening tool in accordance with the present invention The present invention, however, is not limited by the embodiments.

Furthermore, in the above-mentioned description, the motor is used as a driving power source. The present invention, however, is not limited the description or drawing of the embodiment. It is possible to use another driving source such as a compressed air, or the like.

Still furthermore, in the above-mentioned description, the lower limit value T1 and/or the upper limit value T2 are/is set in the torque setter 23 by the user. It, however, is possible that the lower limit value T1 and/or the upper limit value T2 are/is previously set in the fastening judger 21.

This application is based on Japanese patent application 2003-354198 filed Oct. 14, 2003 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A power fastening tool comprising: a motor; a motor controller that controls the start and stop of the driving of the motor; a power transmitter that transmits a driving force of the motor to an output shaft to fasten or loosen a fastening member; a torque estimator that estimates a value of a torque that fastens the fastening member; and a fastening judger that judges whether the fastening member is fastened completely, or not;

wherein the fastening judger calculates a torque variation quantity which is a ratio of variation of the estimated torque with respect to a rotation angle of a shaft of the motor or elapsed time, and a torque variation ratio which is a ratio of the torque variation quantity with respect to the rotation angle of the shaft of the motor or elapsed time, and judges that the fastening operation is completed when at least a condition that a value of the estimated torque becomes larger than a predetermined lower limit value of the torque and a value of the torque variation ratio varies from positive to negative is satisfied; and said power fastening tool further comprises a torque setter by which a user can optionally set the lower limit value.

2. The power fastening tool in accordance with claim 1, wherein an upper limit value of the torque is set; and the motor controller stops the driving of the motor when the fastening judger judges that the value of the estimated torque that fastens the fastening member becomes larger than the upper limit value.

3. The power fastening tool in accordance with claim 2, further comprising a torque setter by which a user can optionally set the lower limit value or the upper limit value.

4. The power fastening tool in accordance with claim 3, wherein the lower limit value or the upper limit value is calculated to have a predetermined ratio with respect to the other of the lower limit value or upper limit value, which is set in the torque setter.

5. The power fastening tool in accordance with claim 4, wherein the predetermined ratio is a ratio of the lower limit value to the upper limit value, and is constant with no relation to the level of the upper limit value.

6. The power fastening tool in accordance with claim 4, wherein the predetermined ratio is a ratio of the lower limit value to the upper limit value, and is calculated in a manner so that the higher the level of the upper limit value becomes, the smaller the ratio of the lower limit value to the upper limit value becomes.

7. The power fastening tool in accordance with claim 3, wherein the upper limit value can be selected among a plurality of values corresponding to a plurality of levels; and
the lower limit value is set to be a value of a level, which is one level lower than the level of the upper limit value.

8. The power fastening tool in accordance with claim 1, wherein the torque setter has a work selection switch that selects a kind of fastening work, and the lower limit value can be set corresponding to the kind of fastening work.

9. The power fastening tool in accordance with claim 3, wherein the torque setter has a work selection switch that selects a kind of fastening work, and the lower limit value and/or the upper limit value can be set corresponding to the kind of fastening work.

10. The power fastening tool in accordance with claim 3, wherein the torque setter has a control mode selection switch that selects a control mode between a normal control mode and an upper limit control;
when the normal control mode is selected, the fastening judger judges whether the fastening operation is completed, or not, corresponding to comparison of the value of the estimated torque with the lower limit value of the torque and judgment whether the value of the torque variation ratio varies from positive to negative, or not; and
when the upper limit control mode is selected, the fastening judger only judges whether the value of the estimated torque becomes larger than the upper limit value, or not.

11. The power fastening tool in accordance with claim 10, wherein the torque setter selects a control mode between a normal control mode and an upper limit control corresponding to the lower limit value;
when the lower limit value is larger than a predetermined value, the fastening judger executes the normal control mode to judge whether the fastening operation is completed, or not, corresponding to comparison of the value of the estimated torque with the lower limit value of the torque and judgment whether the value of the torque variation ratio varies from positive to negative, or not; and
when the lower limit value is equal to or smaller than the predetermined value, the fastening judger executes the upper limit control mode only to judge whether the value of the torque that fastens the fastening member becomes larger than the upper limit value, or not.

12. The power fastening tool in accordance with claim 1, wherein the torque setter has a size selector that selects a size of the fastening member among a plurality of sizes previously set and a kind selector that selects a kind of a component to be fastened by the fastening member among a plurality of kinds previously selected, and the lower limit value is selected among a plurality of values corresponding to a combination of the size of the fastening member and the kind of the component to be fastened.

13. The power fastening tool in accordance with claim 3, wherein the torque setter has a size selector that selects a size of the fastening member among a plurality of sizes previously set and a kind selector that selects a kind of a component to be fastened by the fastening member among a plurality of kinds previously selected, and the lower limit value and/or the upper limit value are/is selected among a plurality of values corresponding to a combination of the size of the fastening member and the kind of the component to be fastened.

14. The power fastening tool in accordance with claim 1, wherein the fastening judger
further calculates a sum or an integration value of the torque variation ratio in a term where the torque variation ratio continuously takes positive values; and
judges that the fastening member has been fastened completely when the condition that the sum or the integration value of the torque variation ratio becomes larger than a predetermined threshold value is satisfied, and the condition that the value of the estimated torque that fastens the fastening member becomes larger than the lower limit value and a value of the torque variation ratio varies from positive to negative.

15. The power fastening tool in accordance with claim 14, wherein the threshold value is set corresponding to the lower limit value.

16. The power fastening tool in accordance with claim 1, wherein the torque setter has a work selection switch that selects the kind of fastening work; and
the fastening judger judges that the fastening operation is completed when an alternative of the condition that the value of the estimated torque becomes larger than the lower limit value of the torque and the value of the torque variation ratio varies from positive to negative, and a condition that a vale of the torque variation quantity varies from positive to negative after the value of the estimated torque becomes larger than the lower limit value of the torque and the value of the torque variation ratio varies from positive to negative is satisfied corresponding to a kind of fastening work.

17. The power fastening tool in accordance with claim 1, wherein when the lower limit value of the torque is equal to or smaller than a predetermined value, the fastening judger judges that the fastening operation is completed when the condition that the value of the estimated torque becomes larger than the lower limit value of the torque and the value of the torque variation ratio varies from positive to negative is satisfied; and
when the lower limit value of the torque is larger than the predetermined value, the fastening judger judges that the fastening operation is completed when a condition that a value of the torque variation quantity varies from positive to negative after the value of the estimated torque becomes larger than the lower limit value of the torque and the value of the torque variation ratio varies from positive to negative is satisfied.

* * * * *